United States Patent
Iwase et al.

(10) Patent No.: US 11,966,154 B2
(45) Date of Patent: Apr. 23, 2024

(54) OPTICAL UNIT

(71) Applicant: NIDEC CORPORATION, Kyoto (JP)

(72) Inventors: Takayuki Iwase, Kyoto (JP); Tomohiro Egawa, Kyoto (JP); Genki Tanaka, Kyoto (JP); Soichiro Kimura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/894,159

(22) Filed: Aug. 24, 2022

(65) Prior Publication Data
US 2023/0063517 A1 Mar. 2, 2023

(30) Foreign Application Priority Data

Aug. 25, 2021 (JP) .................................. 2021-137524

(51) Int. Cl.
G03B 5/06 (2021.01)
G03B 17/17 (2021.01)
G03B 30/00 (2021.01)

(52) U.S. Cl.
CPC .............. *G03B 5/06* (2013.01); *G03B 17/17* (2013.01); *G03B 30/00* (2021.01); *G03B 2205/003* (2013.01); *G03B 2205/0069* (2013.01)

(58) Field of Classification Search
CPC .. G03B 5/06; G03B 17/17; G03B 2205/0023; G02B 7/18
See application file for complete search history.

(56) References Cited

U.S. PATENT DOCUMENTS 10,488,631 B2  11/2019  Bachar et al.
10,516,773 B2  12/2019  Yoon et al.
10,678,062 B2  6/2020  Im et al.
11,366,333 B2  6/2022  Fujisaki et al.
2015/0002683 A1* 1/2015  Hu .................. G03B 17/17
                                            348/208.11

(Continued)

FOREIGN PATENT DOCUMENTS

CN  209311846 U  8/2019
JP  2012118336 A  6/2012

OTHER PUBLICATIONS

Definition of Suction from the online Merriam Webster Dictionary. Printed from www.merriam-webster.com/dictionary/suction on Oct. 6, 2023.*

*Primary Examiner* — Christopher E Mahoney
(74) *Attorney, Agent, or Firm* — HAUPTMAN HAM, LLP

(57) ABSTRACT

An optical unit includes a movable body including an optical element, a support body swingably supporting the movable body, and a suction mechanism. The optical element reflects light traveling in a first direction to an intersecting second direction. The suction mechanism generates suction force in the movable body between the movable body and the support body, and includes a magnet and a magnetic member. One of the magnet and the magnetic member is in the movable body, while the other is in the support body. The magnet and the magnetic member overlap each other when viewed from a predetermined direction, which is one of the first direction, the second direction, and a third direction. The third direction intersects the first and second directions. When viewed from the predetermined direction, a center of the magnet and a center of the magnetic member are separated from each other.

11 Claims, 17 Drawing Sheets

(56) References Cited

U.S. PATENT DOCUMENTS

| | | | |
|---|---|---|---|
| 2016/0124242 A1* | 5/2016 | Minamisawa | ....... G02B 27/646 |
| | | | 359/557 |
| 2019/0129197 A1 | 5/2019 | Kim et al. | |
| 2019/0230255 A1 | 7/2019 | Fu et al. | |
| 2020/0363626 A1 | 11/2020 | Seo et al. | |
| 2021/0072530 A1 | 3/2021 | Tsai et al. | |
| 2021/0397016 A1 | 12/2021 | Hu et al. | |

* cited by examiner

OPTICAL UNIT

CROSS-REFERENCE TO RELATED APPLICATIONS

The present invention claims priority under 35 U.S.C. § 119 to Japanese Patent Application No. 2021-137524 filed on Aug. 25, 2021, the entire content of which is incorporated herein by reference.

FIELD OF THE INVENTION

The present disclosure relates to an optical unit.

BACKGROUND

Image blur may be generated due to camera shake during capturing a still image or a moving image with a camera. A camera shake correction device enabling the capturing of a clear image by preventing the image blur has been put into practical use.

For example, conventionally, a camera module including a reflection module and a drive holder supporting the reflection module is known. The reflection module includes a reflection member and a drive frame to which the reflection member is attached. The drive frame rotates about a rotation axis relative to the drive holder. A tension magnet is disposed in the drive frame. A tension yoke is disposed in the drive holder. Attractive force is formed between the drive frame and the drive holder.

Meanwhile, in the conventional camera module, a magnet and a yoke are usually disposed such that centers of the magnet and the yoke overlap each other when viewed from an optical axis direction or a direction intersecting an optical axis.

However, when viewed from the optical axis direction or the direction intersecting the optical axis, because the centers of the magnet and the center of the yoke are arranged to overlap each other, the attractive force is generated between the magnet and the yoke only in the optical axis direction or the direction intersecting the optical axis.

SUMMARY

An exemplary optical unit of the present disclosure includes a movable body, a support body, and a first attraction mechanism. The movable body includes an optical element. The optical element reflects light traveling on one side in a first direction to one side in a second direction intersecting the first direction. The support body supports the movable body swingably about a swing axis. The first attraction mechanism generates attraction force in the movable body between the movable body and the support body. The first attraction mechanism includes a first attraction magnet and a first attraction magnetic member. One of the first attraction magnet and the first attraction magnetic member is disposed in the movable body. The other of the first attraction magnet and the first attraction magnetic member is disposed in the support body. The first attraction magnet and the first attraction magnetic member overlap each other when viewed from a first predetermined direction. The first predetermined direction is any one of the first direction, the second direction, and a third direction. The third direction is a direction intersecting the first direction and the second direction. When viewed from the first predetermined direction, a center of the first attraction magnet and a center of the first attraction magnetic member are separated from each other.

The above and other elements, features, steps, characteristics and advantages of the present disclosure will become more apparent from the following detailed description of the preferred embodiments with reference to the attached drawings.

DETAILED DESCRIPTION

Figure 1:
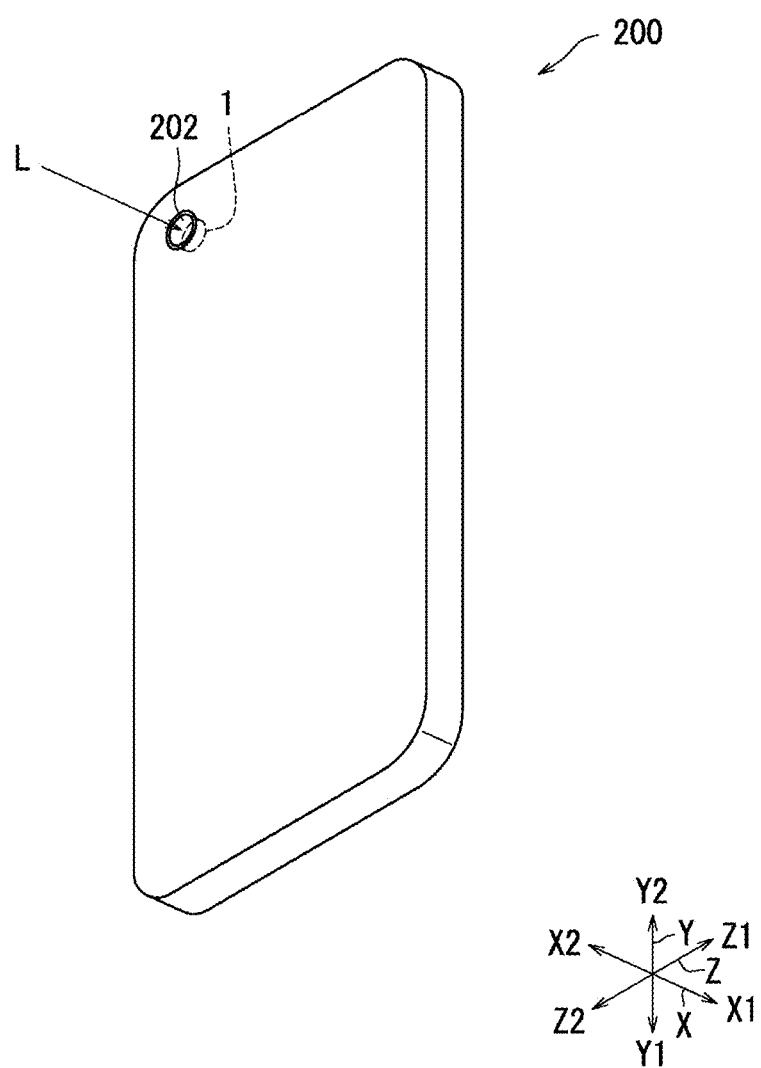
FIG. 1 is a perspective view schematically illustrating a smartphone including an optical unit according to an embodiment of the present disclosure.

With reference to the drawings, an exemplary embodiment of the present disclosure will be described below. In the drawings, the same or corresponding parts are given the same reference signs and description thereof will not be repeated.

In the present specification, a first direction X, a second direction Y, and a third direction Z intersecting each other are appropriately described for easy understanding. In the present description, the first direction X, the second direction Y, and the third direction Z are orthogonal to one another, but are not necessarily orthogonal to one another. One side in the first direction is referred to as one side X1 in the first direction X, and the other side in the first direction is referred to as the other side X2 in the first direction X. One side in the second direction is referred to as one side Y1 in the second direction Y, and the other side in the second direction is referred to as the other side Y2 in the second direction Y. One side in the third direction is referred to as one side Z1 in the third direction Z, and the other side in the third direction is referred to as the other side Z2 in the third direction Z. For convenience, the first direction X is sometimes described as an up-down direction. One side X1 in the first direction X corresponds to a lower side, and the other side X2 in the first direction X corresponds to an upper side. However, the up-down direction, the upward direction, and the lower direction are defined for convenience of the description, and do not necessarily coincide with the vertical direction. The up-down direction is defined just for convenience of the description, and does not limit an orientation during use and assembly of the optical unit of the present disclosure.

With reference to FIG. 1, an example of application of an optical unit 1 will be described. FIG. 1 is a perspective view schematically illustrating a smartphone 200 including the optical unit 1 according to an embodiment of the present disclosure. The smartphone 200 includes the optical unit 1. The optical unit 1 reflects incident light in a certain direction. As illustrated in FIG. 1, the optical unit 1 is suitably used as, for example, an optical component of the smartphone 200. The application of the optical unit 1 is not limited to the smartphone 200, and can be used for various devices such as a digital camera and a video camera.

The smartphone 200 includes a lens 202 on which light is incident. In the smartphone 200, the optical unit 1 is disposed inside the lens 202. When light L enters the inside of the smartphone 200 through the lens 202, a traveling direction of the light L is changed by the optical unit 1. The light L is imaged by an imaging element (not illustrated) through a lens unit (not illustrated).

Figure 2:
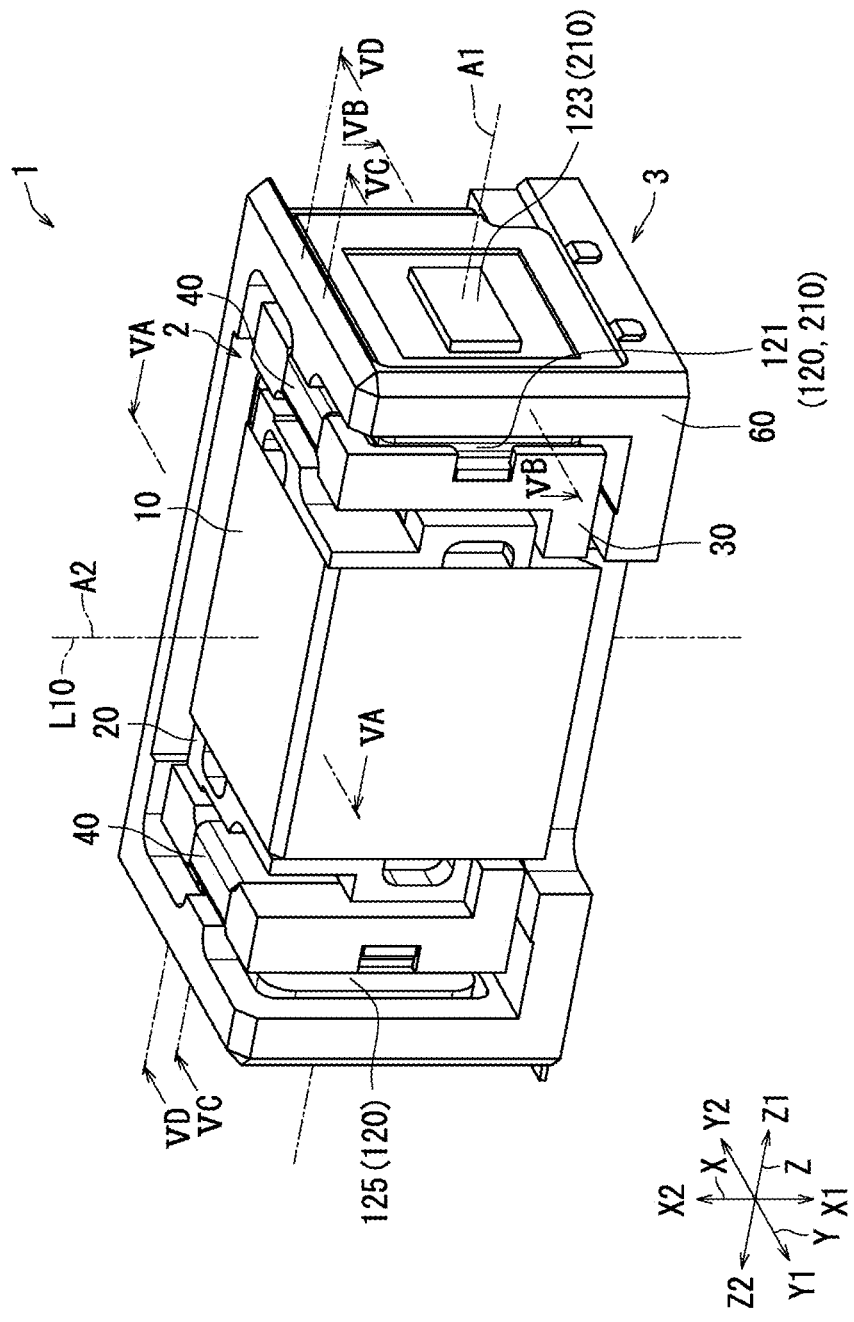
FIG. 2 is a perspective view illustrating the optical unit of the embodiment.
Figure 3:
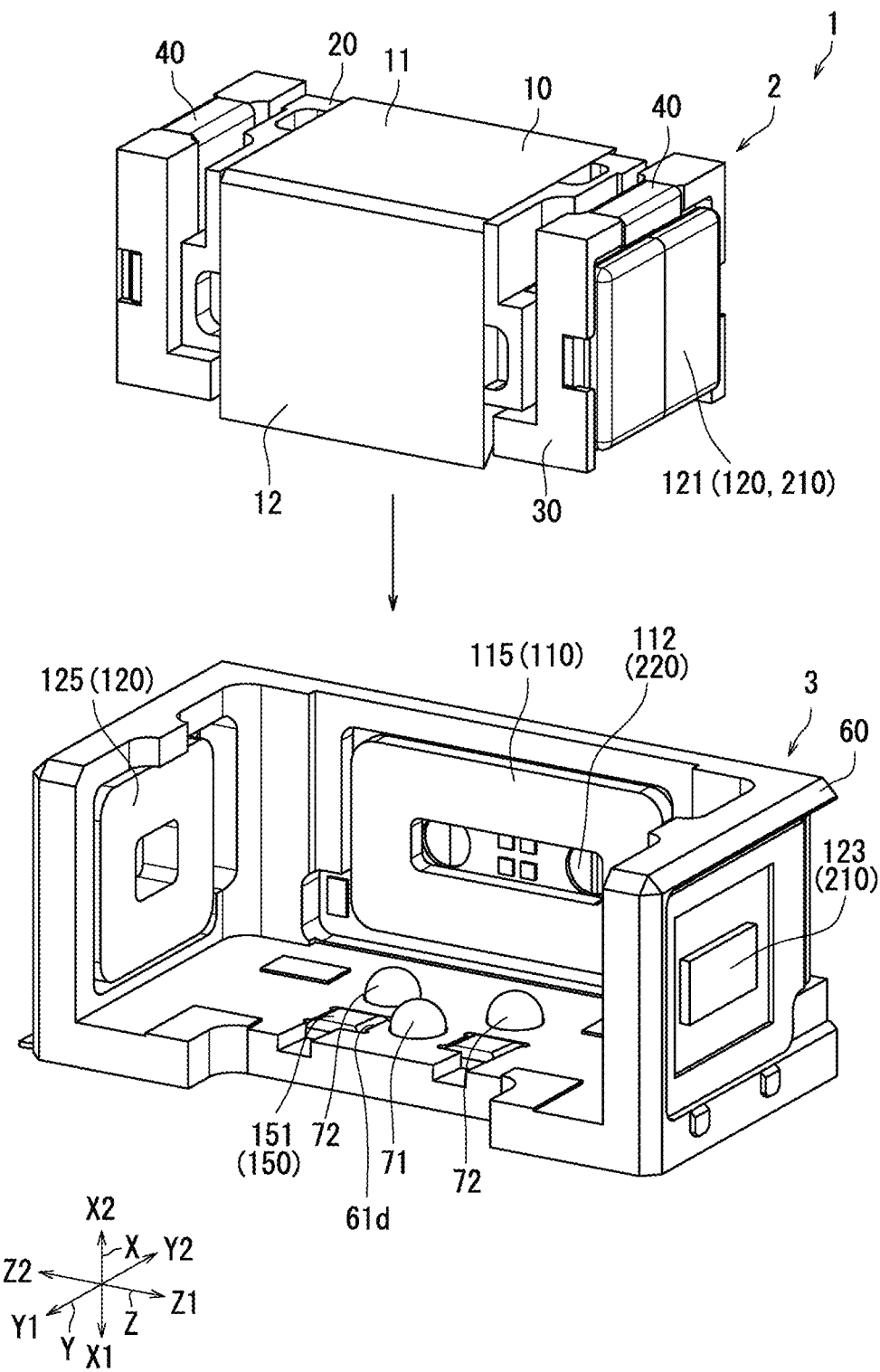
FIG. 3 is an exploded perspective view illustrating the optical unit of the embodiment in which the optical unit is separated into a movable body and a support body.

With reference to FIGS. 2 to 13, the optical unit 1 will be described below. FIG. 2 is a perspective view illustrating the optical unit 1 of the embodiment. FIG. 3 is an exploded perspective view illustrating the optical unit 1 of the embodiment in which the optical unit 1 is separated into a movable body 2 and a support body 3. As illustrated in FIGS. 2 and 3, the optical unit 1 includes the movable body 2, the support body 3, and a first attraction mechanism 210.

In this specification, in order to facilitate understanding, first an outline of the optical unit 1 of the embodiment will be described. The movable body 2 includes an optical element 10. The optical element 10 reflects the light L (see FIG. 2) traveling onto one side in the first direction X to one side Y1 in the second direction Y intersecting the first direction X. The support body 3 supports the movable body 2 swingably about a second swing axis A2. The second swing axis A2 is an example of the "swing axis" of the present disclosure. The first attraction mechanism 210 generates attraction force (hereinafter, sometimes referred to as attractive force) in the movable body 2 between the movable body 2 and the support body 3. In the present specification, the attraction force means force that attracts each other between two substances.

The swing axis extends along one of the first direction X and the second direction Y. The support body 3 supports the movable body 2 in the axial direction of the swing axis. Accordingly, the support body 3 can easily swing the movable body 2 about the swing axis. In the embodiment, an example in which the support body 3 supports the movable body 2 in the axial direction of the second swing axis A2 extending in the first direction X will be described. However, the present disclosure is not limited thereto. For example, the support body 3 may support the movable body 2 in the axial direction of the first swing axis A1 extending in the second direction Y.

The first attraction mechanism 210 includes a second magnet 121 and a magnetic member 123. The second magnet 121 is an example of the "first attraction magnet" of the present disclosure. The magnetic member 123 is an example of a "first attraction magnetic member" of the present disclosure. One of the second magnet 121 and the magnetic member 123 is disposed in the movable body 2. The other of the second magnet 121 and the magnetic member 123 is disposed in the support body 3. The second magnet 121 and the magnetic member 123 overlap each other when viewed from the first predetermined direction. The first predetermined direction is one of the first direction X, the second direction Y, and the third direction Z. The third direction Z is a direction intersecting the first direction X and the second direction Y. In the embodiment, the first predetermined direction is the third direction Z. Accordingly, the attractive force in the third direction Z can be generated in the movable body 2.

Figure 5A:
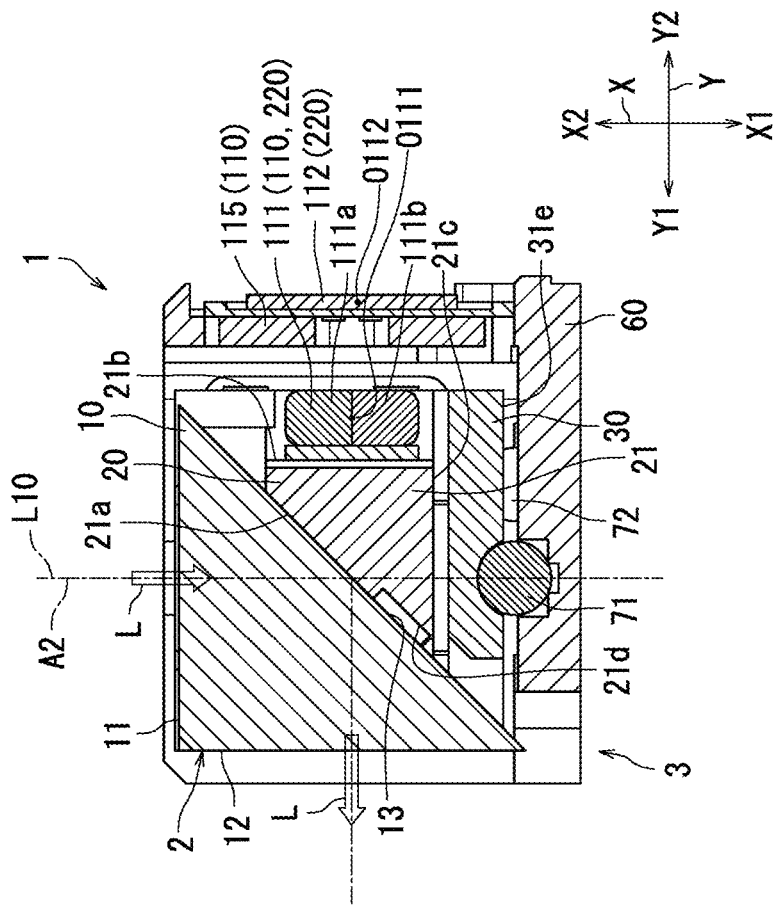
FIG. 5A is a sectional view taken along a line VA-VA in FIG. 2.
Figure 5B:
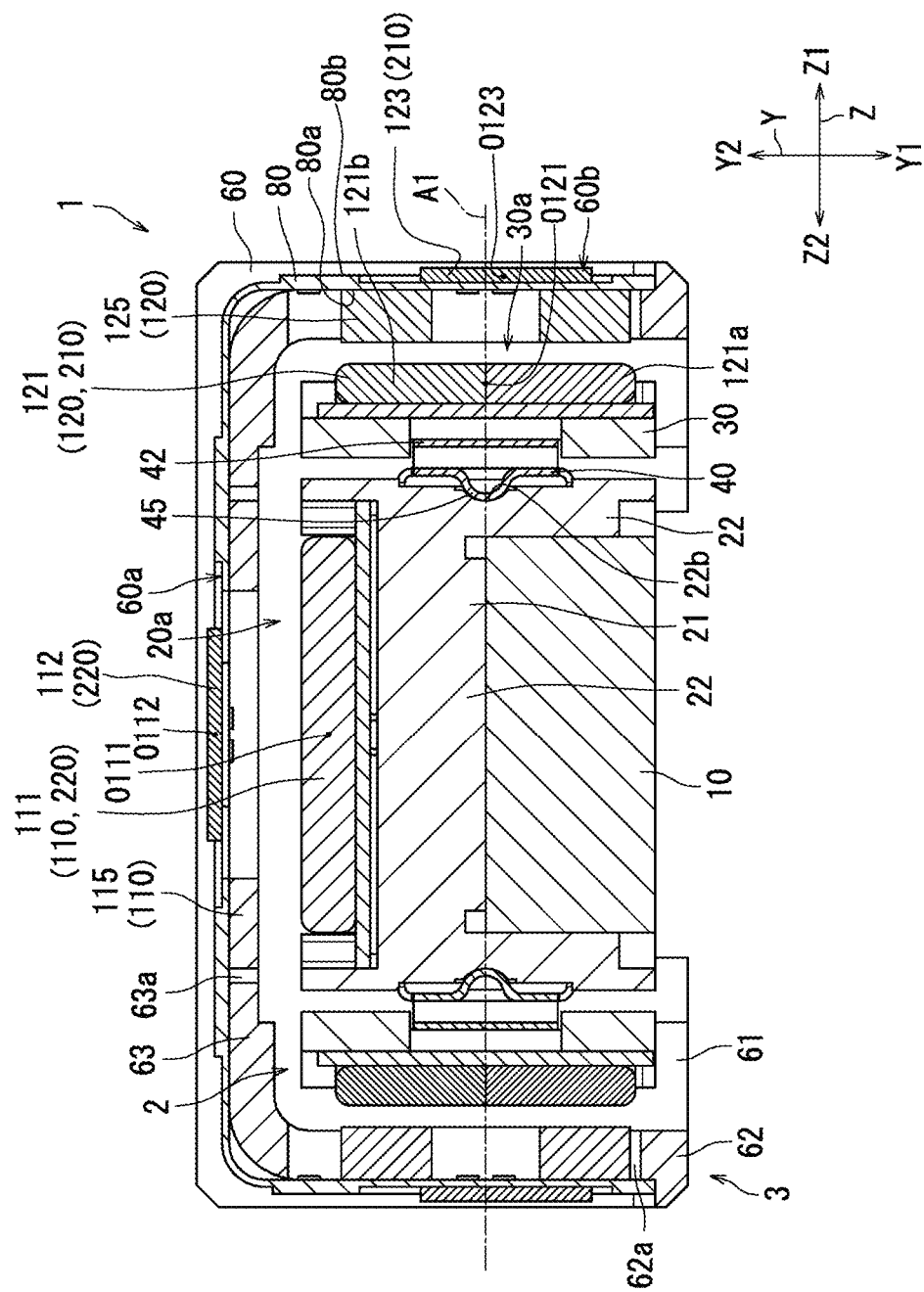
FIG. 5B is a sectional view taken along a line VB-VB in FIG. 2.

As illustrated in FIG. 5B, a center 0121 of the second magnet 121 and a center 0123 of the magnetic member 123 are separated from each other when viewed from the first predetermined direction. Accordingly, between the movable body 2 and the support body 3, the attractive force can be generated in two directions of the first predetermined direction and a direction other than the first predetermined direction. In the embodiment, between the movable body 2 and the support body 3, the attractive force can be generated in two directions of the third direction Z and the second direction Y.

The optical unit 1 further includes a second attraction mechanism 220 that generates attraction force in the movable body 2 between the movable body 2 and the support body 3. The second attraction mechanism 220 includes a first magnet 111 and a magnetic member 112. The first magnet 111 is an example of the "second attraction magnet" of the present disclosure. The magnetic member 112 is an example of the "second attraction magnetic member" of the present disclosure. One of the first magnet 111 and the magnetic member 112 is disposed in the movable body 2. The other of the first magnet 111 and the magnetic member 112 is disposed in the support body 3.

The center of the other (the member disposed on the support body 3) of the second magnet 121 and the magnetic member 123 of the first attraction mechanism 210 is disposed on one side in a second predetermined direction intersecting the first predetermined direction with respect to the center of one (the member disposed on the movable body 2) of the second magnet 121 and the magnetic member 123. In the embodiment, the center 0123 of the magnetic member 123 disposed in the support body 3 is disposed on one side Y1 of the second direction Y intersecting the third direction Z with respect to the center 0121 of the second magnet 121 disposed in the movable body 2. The center of the other (the member disposed on the support body 3) of the first magnet 111 and the magnetic member 112 of the second attraction mechanism 220 is disposed on the other side in the second predetermined direction with respect to the center of one (the member disposed on the movable body 2) of the first magnet 111 and the magnetic member 112. Accordingly, a direction of the force acting on the movable body 2 by the second attraction mechanism 220 and a direction of the force acting on the movable body 2 by the first attraction mechanism 210 can be reversed in the second predetermined direction. Consequently, the force in the second predetermined direction acting on the movable body 2 by the second attraction mechanism 220 can be canceled or reduced by the first attraction mechanism 210. In the embodiment, a center 0112 of the magnetic member 112 disposed on the support body 3 is disposed on the other side Y2 in the second direction Y with respect to a center 0111 of the first magnet 111 disposed on the movable body 2. The center 0111 of the first magnet 111 and the center 0112 of the magnetic member 112 are disposed at the same position as the second swing axis A2 in the third direction Z.

As illustrated in FIGS. 3 and 5B, the movable body 2 includes a holder 20 that holds the optical element 10 and a first support 30 that swingably supports the holder 20. The support body 3 includes a second support 60 that swingably supports the first support 30. One of the second magnet 121 and the magnetic member 123 of the first attraction mechanism 210 is disposed in the first support 30. The other of the second magnet 121 and the magnetic member 123 is disposed in the second support 60. One of the first magnet 111 and the magnetic member 112 of the second attraction mechanism 220 is disposed in the holder 20. The other of the first magnet 111 and the magnetic member 112 is disposed in the second support 60.

Accordingly, the attraction force can be caused to act on the other side in the second predetermined direction with respect to the holder 20 while the force in the second predetermined direction acting on the first support 30 is canceled or reduced. Specifically, the second attraction mechanism 220 applies the attraction force to the holder 20 on the other side in the second predetermined direction. At this point, the force also acts on the other side in the second predetermined direction in the first support 30 that supports the holder 20. In addition, the first attraction mechanism 210 applies the attraction force to one side in the second predetermined direction with respect to the first support 30. Accordingly, resultant force in the second predetermined direction of the second attraction mechanism 220 and the first attraction mechanism 210 with respect to the first support 30 can be zero or reduced. On the other hand, the force can be applied to the other side in the second predetermined direction with respect to the holder 20.

The structure of the optical unit 1 of the embodiment will be described in detail below.

Figure 4:
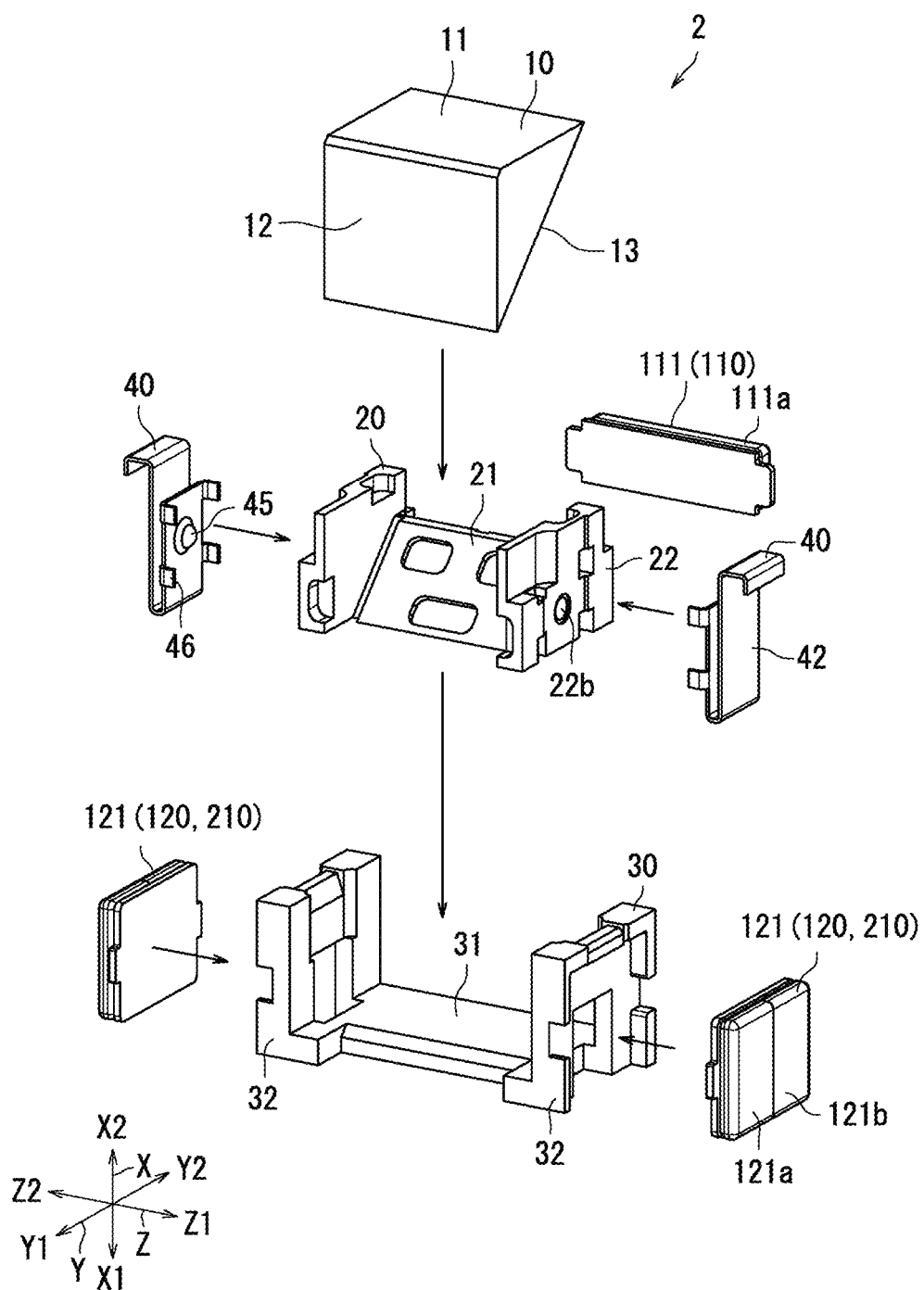
FIG. 4 is an exploded perspective view illustrating the movable body of the optical unit of the embodiment.

FIG. 4 is an exploded perspective view illustrating the movable body 2 of the optical unit 1 of the embodiment. As illustrated in FIGS. 2 to 4, the optical unit 1 includes the movable body 2 and the support body 3. The support body 3 supports the movable body 2 swingably about a second swing axis A2. The second swing axis A2 is an example of the "swing axis" of the present disclosure.

The movable body 2 includes an optical element 10. The movable body 2 includes a holder 20 and a first support 30. The movable body 2 includes the preload unit 40. The optical element 10 changes the traveling direction of light. The holder 20 holds the optical element 10. The first support 30 supports the holder 20 and the optical element 10 swingably about a first swing axis A1 that intersects the second swing axis A2. The first support 30 is supported by the support body 3 swingably about the second swing axis A2. More specifically, the first support 30 is supported by a second support 60 of the support body 3 swingably about the second swing axis A2.

That is, the holder 20 is swingable with respect to the first support 30, and the first support 30 is swingable with respect to the second support 60. Accordingly, the optical element 10 can be swung about each of the first swing axis A1 and the second swing axis A2, so that an attitude of the optical element 10 can be corrected about each of the first swing axis A1 and the second swing axis A2. Consequently, the image blur can be prevented in two directions. As a result, correction accuracy can be improved as compared with the case in which the optical element 10 is swung about only one swing axis. The first swing axis A1 is also referred to as a pitching axis. The second swing axis A2 is also referred to as a roll axis.

In the embodiment, as described above, the first support 30 supports the holder 20 and the optical element 10. The first support 30 is supported by the second support 60. That is, the holder 20 and the optical element 10 are indirectly supported by the second support 60 of the support body 3 through the first support 30. The holder 20 and the optical element 10 may be directly supported by the second support 60 of the support body 3 without the first support 30. That is, the movable body 2 may not include the first support 30.

In the embodiment, as described above, the first support 30 supports the holder 20 and the optical element 10. The first support 30 is supported by the second support 60. That is, the holder 20 and the optical element 10 are indirectly supported by the second support 60 of the support body 3 through the first support 30. The holder 20 and the optical element 10 may be directly supported by the second support 60 of the support body 3 without the first support 30. That is, the movable body 2 may not include the first support 30.

The first swing axis A1 is an axis extending along the third direction Z intersecting the first direction X and the second direction Y. The second swing axis A2 is an axis extending along the first direction X. Accordingly, the optical element 10 can be swung about the first swing axis A1 intersecting the first direction X and the second direction Y. The optical element 10 can be swung about the second swing axis A2 extending along the first direction X. Consequently, the attitude of the optical element 10 can be appropriately corrected. The first direction X and the second direction Y are directions along the traveling direction of the light L (FIG. 5A). That is, the optical element 10 can be swung about the first swing axis A1 intersecting the first direction X and the second direction Y that are the traveling direction of light. Accordingly, the attitude of the optical element 10 can be corrected more appropriately.

The first support 30 supports the holder 20 in the third direction Z. Accordingly, the first support 30 can be easily swung about the first swing axis A1 extending along the third direction Z. Specifically, in the embodiment, the first support 30 supports the holder 20 in the third direction Z through the preload unit 40.

Figure 5C:
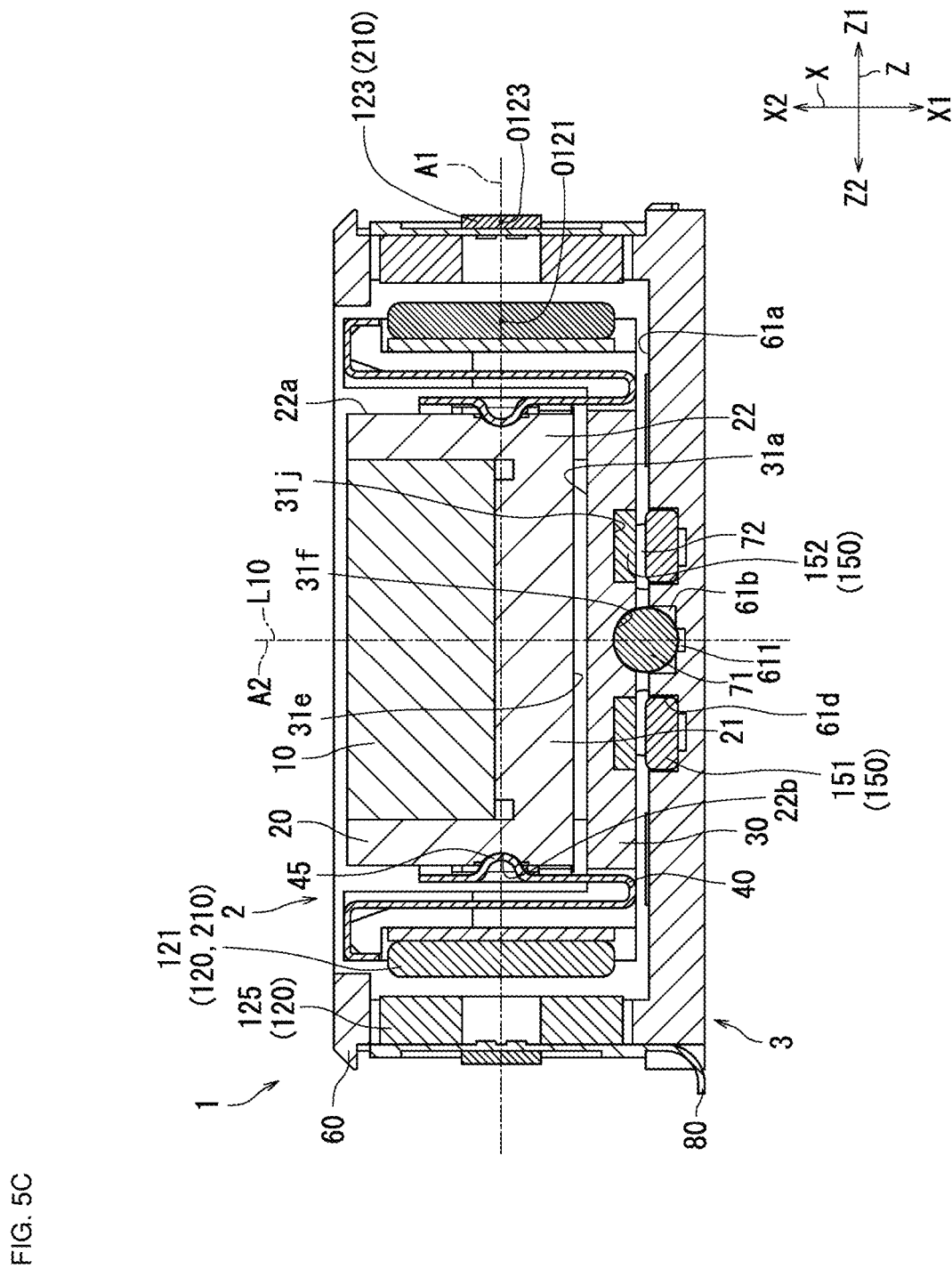
FIG. 5C is a sectional view taken along a line VC-VC in FIG. 2.
Figure 5D:
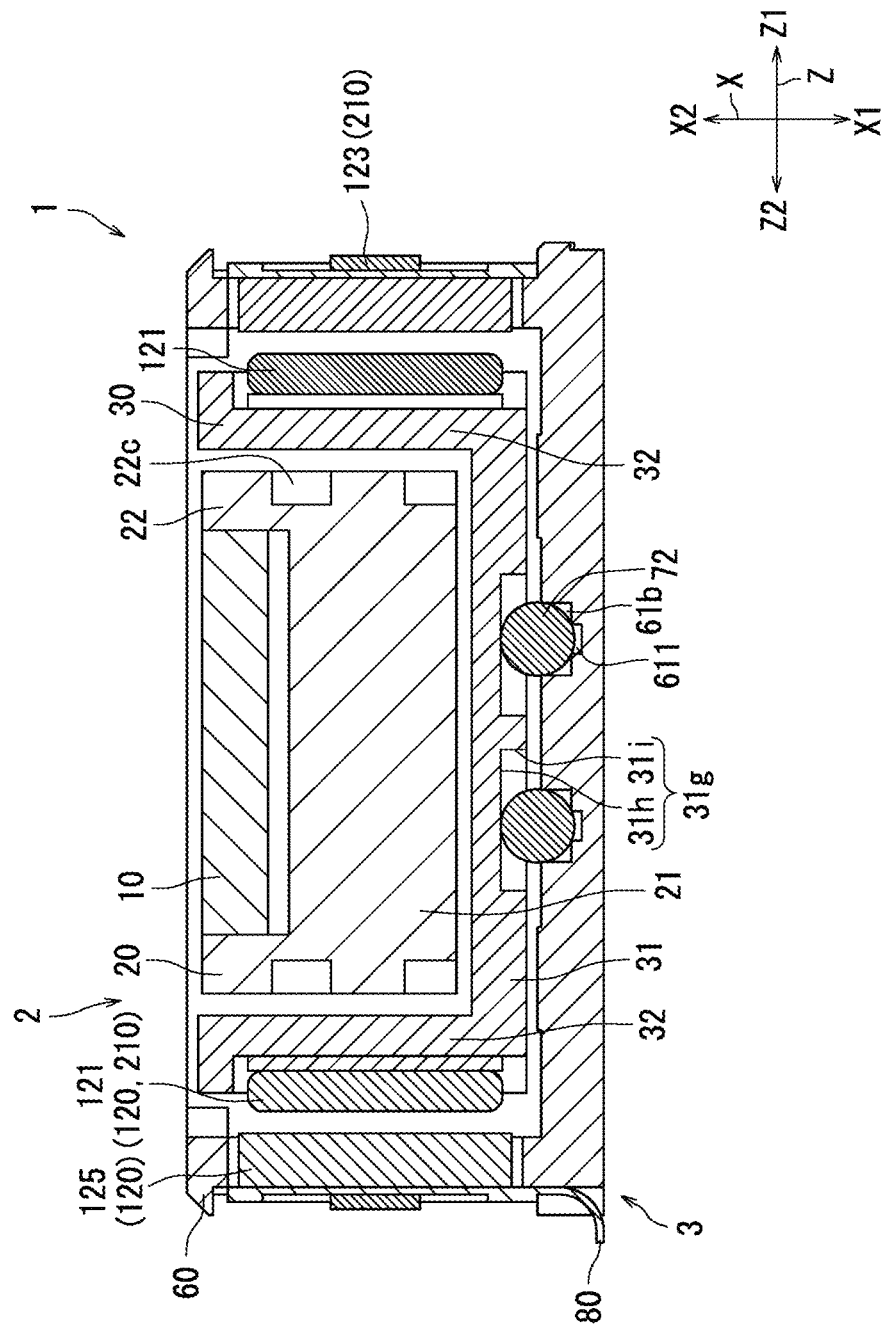
FIG. 5D is a sectional view taken along a line VD-VD in FIG. 2.
Figure 6:
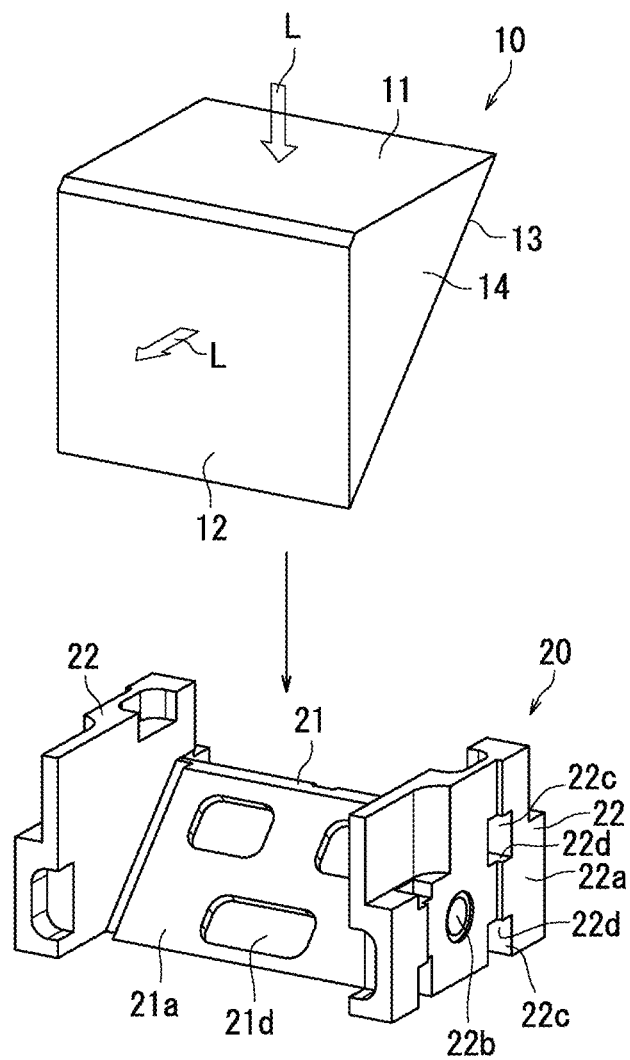
FIG. 6 is an exploded perspective view illustrating an optical element and a holder of the optical unit of the embodiment.
Figure 6:
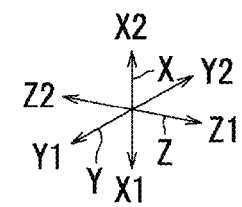

FIG. 5A is a sectional view taken along a line VA-VA in FIG. 2. FIG. 5B is a sectional view taken along a line VB-VB in FIG. 2. FIG. 5C is a sectional view taken along a line VC-VC in FIG. 2. FIG. 5D is a sectional view taken along a line VD-VD in FIG. 2. FIG. 6 is an exploded perspective view illustrating the optical element 10 and the holder 20 of the optical unit 1 of the embodiment. As illustrated in FIGS. 5A to 5D and 6, the optical element 10 is configured of a prism. The prism is made of a transparent material that has a higher refractive index than air. For example, the optical element 10 may be a plate-shaped mirror. In the embodiment, the optical element 10 has a substantially triangular prism shape. Specifically, the optical element 10 includes a light incident surface 11, a light emission surface 12, a reflection surface 13, and a pair of side surfaces 14. The light L is incident on the light incident surface 11. The light emission surface 12 is connected to the light incident surface 11. The light emission surface 12 is disposed perpendicular to the light incident surface 11. The reflection surface 13 is connected to the light incident surface 11 and the light emission surface 12. The reflection surface 13 is inclined by about 45 degrees with respect to each of the light incident surface 11 and the light emission surface 12. That is, the reflection surface 13 reflects the light L traveling to one side X1 in the first direction X to one side Y1 in the second direction Y intersecting the first direction X. The pair of side surfaces 14 are connected to the light incident surface 11, the light emission surface 12, and the reflection surface 13.

An optical axis L10 of the optical element 10 and the second swing axis A2 are disposed to overlap each other. In the present description, the optical axis L10 of the optical element 10 means an axis that coincides with at least any of an axis that is perpendicular to the light incident surface 11 of the optical element 10 and passes through the center of the reflection surface 13, a light axis of the lens 202 on which light is incident, an axis that passes through an intersection between the optical axis of the lens unit existing at the reflection destination and the reflection surface 13 and extends in the direction perpendicular to the optical axis of the lens unit, and an axis that passes through an intersection between a straight line passing through the center of the imaging element and the reflection surface 13 and extends in the direction perpendicular to a straight line passing through the imaging element. Typically, all the axis that is perpendicular to the light incident surface 11 of the optical element 10 and passes through the center of the reflection surface 13, the light axis of the lens 202 on which the light is incident, the axis that passes through an intersection between the optical axis of the lens unit present at the reflection destination and the reflection surface 13 and extends in the direction perpendicular to the optical axis of the lens unit, and the axis that passes through the intersection between the straight line passing through the center of the imaging element and the reflection surface 13 and extends in the direction perpendicular to the straight line passing through the imaging element coincide with one another.

At least one of the holder 20 and the first support 30 includes a recess recessed on the side opposite to the preload unit 40 or a protrusion protruding toward the preload unit 40. In the embodiment, the holder 20 includes an axial recess 22b that is recessed on the side opposite to the preload unit 40.

Specifically, for example, the holder 20 is made of resin. The holder 20 includes a holder body 21 and a pair of side surface units 22. The holder 20 includes a pair of opposing side surfaces 22a and the axial recess 22b.

The holder body 21 extends in the third direction Z. The holder body 21 includes a support surface 21a and a plurality of recesses 21d. In the embodiment the holder body 21 includes three recesses 21d. The support surface 21a supports the optical element 10. The support surface 21a is a surface that faces the reflection surface 13 of the optical element 10 and is connected to the pair of side surface units 22. The support surface 21a is an inclination surface inclined by about 45 degrees with respect to the incident direction of the light L, and is in contact with the reflection surface 13 of the optical element 10 over substantially an entire area of the inclination surface. The incident direction of the light L is a direction toward one side X1 in the first direction X. The recess 21d is disposed on the support surface 21a. The recess 21d is recessed on the side opposite to the optical element 10. The holder body 21 does not need to include the recess 21d.

The holder body 21 includes a back surface 21b and a lower surface 21c. The back surface 21b is connected to the support surface 21a at an end on the side opposite to the emission direction of the light L. The "emission direction of the light L" is one side Y1 in the second direction Y. The "end on the side opposite to the emission direction of the light L" is the end on the other side Y2 in the second direction Y. The lower surface 21c is connected to the support surface 21a and the back surface 21b.

The pair of side surface units 22 extend in an intersection direction intersecting the third direction Z from the holder body 21. For example, the intersection direction includes the first direction X and the second direction Y. The pair of side surface units 22 are disposed at both ends of the holder body 21 in the third direction Z. The pair of side surface units 22 has a shape symmetrical to each other in the third direction Z. The pair of opposing side surfaces 22a are disposed on the pair of side surface units 22. The pair of opposing side surfaces 22a is opposite to a pair of the preload units 40. A detailed structure of the preload unit 40 will be described later. The axial recess 22b is disposed on the opposing side surface 22a. The axial recess 22b is recessed toward an inside of the holder 20 on the first swing axis A1. The axial recess 22b accommodates at least a part of an axial protrusion 45 of the preload unit 40. The axial recess 22b includes at least a part of a recessed spherical surface.

One of the holder 20 and the first support 30 includes a restriction recess 22c. The restriction recess 22c restricts a protrusion 46 of the preload unit 40 from moving in the direction intersecting the first swing axis A1.

In the embodiment, the holder 20 includes the restriction recess 22c. Specifically, the restriction recess 22c is disposed in the opposing side surface 22a. The restriction recess 22c restricts the preload unit 40 from moving by at least a predetermined distance along the side surface unit 22. More specifically, the restriction recess 22c is recessed toward the inside of the holder 20 in the third direction Z. The restriction recess 22c includes an inner surface 22d. For example, the restriction recess 22c may be a recess in which both sides in the first direction X and both sides in the second direction Y are closed. For example, the restriction recess 22c may be a recess in which one side in the first direction X is opened or a recess in which one side in the second direction Y is opened.

The protrusion 46 of the preload unit 40 is disposed in the restriction recess 22c. The protrusion 46 of the preload unit 40 is separated from the inner surface 22d of the restriction recess 22c at a predetermined distance while the axial protrusion 45 is fitted in the axial recess 22b. On the other hand, when impact or the like is applied to the optical unit 1 and when the holder 20 is about to move in the first direction X and the second direction Y by at least a predetermined distance, the protrusion 46 of the preload unit 40 comes into contact with the inner surface 22d of the restriction recess 22c. Accordingly, the holder 20 can be prevented from coming off from the preload unit 40. In the embodiment, for example, four restriction recesses 22c are provided. The number of the restriction recesses 22c may be one, but preferably a plurality of restriction recesses 22c are provided.

The optical unit 1 includes the preload unit 40. The preload unit 40 connects the holder 20 and the first support 30. The preload unit 40 is elastically deformable. The preload unit 40 is disposed on at least one of the holder 20 and the first support 30. The preload unit 40 applies a preload to at least the other of the holder 20 and the first support 30 in an axial direction of the first swing axis A1.

Accordingly, the holder 20 can be prevented from displacing in the axial direction of the first swing axis A1 with respect to the first support 30. Even when a manufacturing error is generated in dimensions of each member, rattling or the like can be prevented from being generated in the axial direction of the first swing axis A1. In other words, for example, the position of the holder 20 can be prevented from being displaced in the axial direction of the first swing axis A1. The axial direction of the first swing axis A1 is a direction along the third direction Z. In the present description, "applying preload" means previously applying a load.

Figure 7:
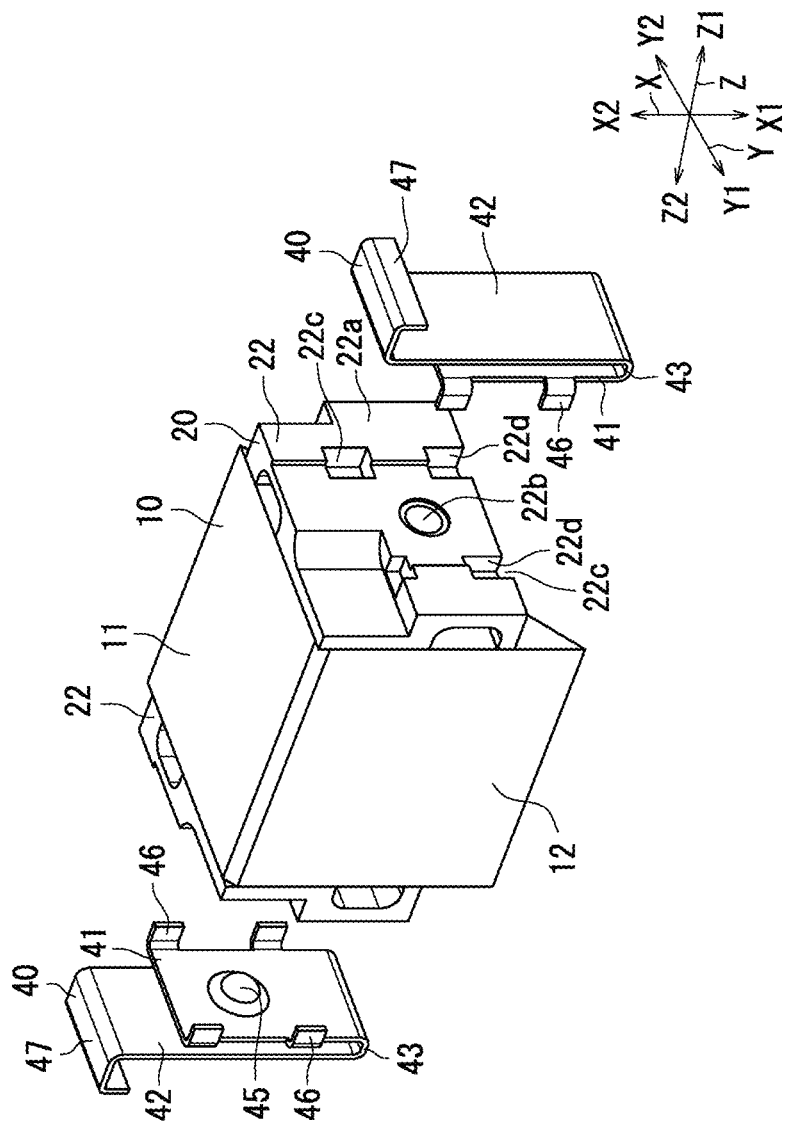
FIG. 7 is an exploded perspective view illustrating the optical element, the holder, and a preload unit of the optical unit of the embodiment.
Figure 8:
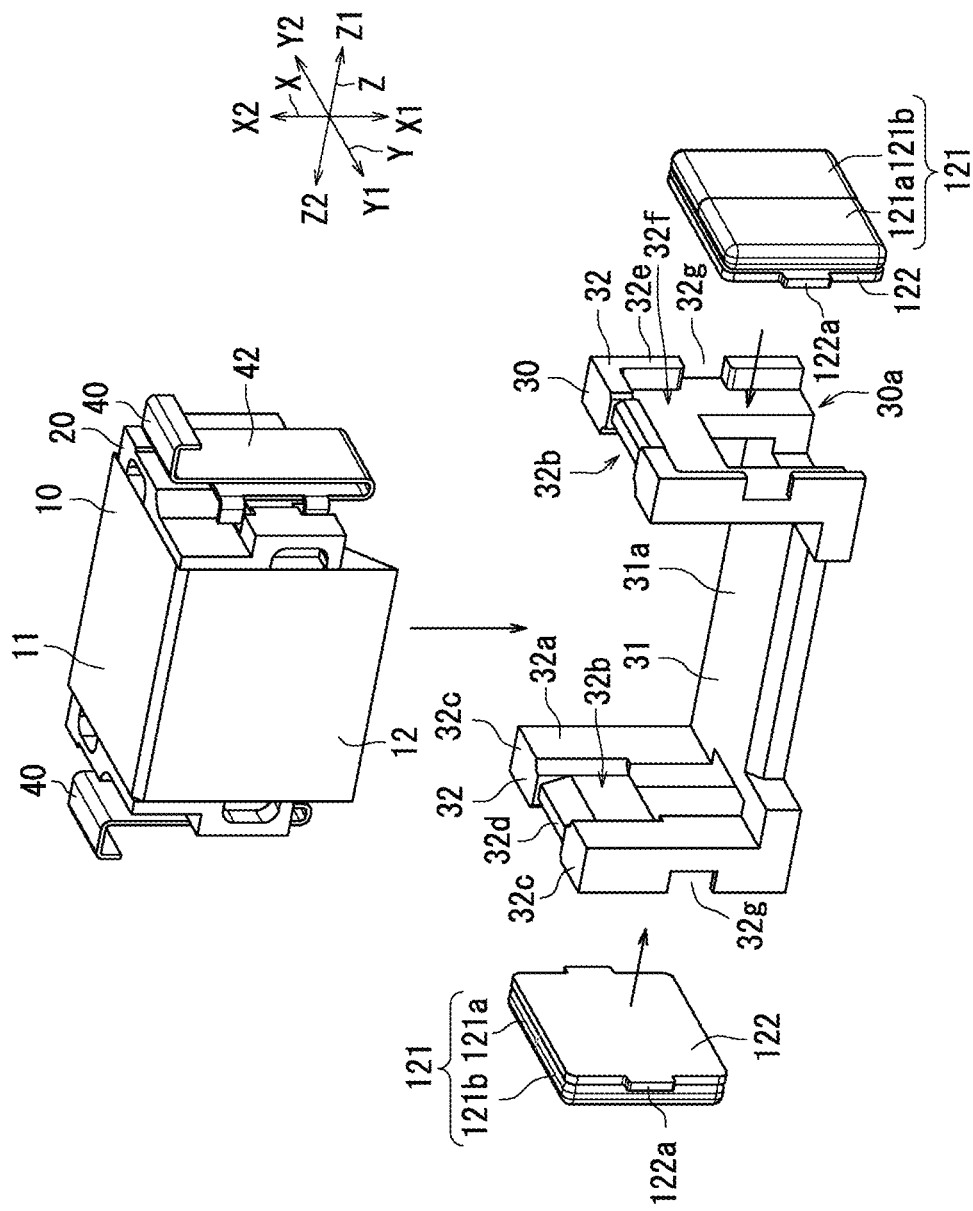
FIG. 8 is an exploded perspective view illustrating the optical element, the holder, the preload unit, a first support, and a second magnet of the optical unit of the embodiment.

With reference to FIGS. 7 and 8, the detailed structure of the preload unit 40 will be described below. FIG. 7 is an exploded perspective view illustrating the optical element 10, the holder 20, and the preload unit 40 of the optical unit 1 of the embodiment. FIG. 8 is an exploded perspective view illustrating the optical element 10, the holder 20, the preload unit 40, the first support 30, and a second magnet 121 of the optical unit 1 of the embodiment. As illustrated in FIGS. 7 and 8, the preload unit 40 is disposed between the holder 20 and the first support 30. The preload unit 40 applies the preload to the holder 20 in the axial direction of the first swing axis A1.

Specifically, in the embodiment, each preload unit 40 is a single member. The preload unit 40 is formed by bending one plate member. In the embodiment, the preload unit 40 is a plate spring. The preload unit 40 is disposed on the first support 30.

The preload unit 40 includes a first surface 41 located on the side of the holder 20, a second surface 42 located on the side of the first support 30, and a curved unit 43 connecting the first surface 41 and the second surface 42. Accordingly, the preload unit 40 can be easily deformed in the axial direction of the first swing axis A1. As a result, elastic force is generated due to the bending of the curved unit 43, so that the preload can be easily applied to the holder 20 in the axial direction with a simple configuration.

Specifically, the first surface 41 is opposite to the holder 20 in the axial direction of the first swing axis A1. The first surface 41 is opposite to the side surface unit 22 of the holder 20. The first surface 41 extends along the first direction X and the second direction Y. The first surface 41 is disposed along the side surface unit 22. The second surface 42 is opposite to the first support 30 in the axial direction of the first swing axis A1. The second surface 42 is opposite to the side surface unit 32 of the first support 30. The second surface 42 extends along the first direction X and the second direction Y. The second surface 42 is disposed along the side surface unit 32.

The curved unit 43 is elastically deformable. Consequently, the first surface 41 and the second surface 42 can move in a direction where the first surface 41 and the second surface 42 approach or separate from each other. In the embodiment, the preload unit 40 is compressed and deformed in the axial direction of the first swing axis A1 such that the first surface 41 and the second surface 42 approach each other while the preload unit 40 is disposed between the holder 20 and the first support 30.

Accordingly, the preload unit 40 applies the preload to the holder 20 by reaction force according to a deformation amount.

The preload unit 40 includes a protrusion protruding toward at least one of the holder 20 and the first support 30 or a recess recessed on the side opposite to at least one of the holder 20 and the first support 30. The protrusion or the recess of the preload unit 40 comes into contact with the protrusion or the recess of at least one of the holder 20 and the first support 30. In the embodiment, the preload unit 40 includes the axial protrusion 45. The axial protrusion 45 protrudes toward the holder 20. The axial protrusion 45 of the preload unit comes into contact with the axial recess 22b of the holder 20.

In the embodiment, the axial protrusion 45 is disposed on the first surface 41. The axial protrusion 45 protrudes toward the holder 20 on the first swing axis A1. The axial protrusion 45 has at least a part of a spherical surface. A part of the axial protrusion 45 is accommodated in the axial recess 22b. Accordingly, the axial protrusion 45 and the axial recess 22b are in point contact with each other, so that the preload unit 40 can stably support the holder 20.

In the embodiment, a pair of preload units 40 is provided. That is, the optical unit 1 includes the pair of preload units 40. The pair of preload units 40 is disposed on both sides of the first swing axis A1 in the axial direction with respect to the holder 20. Accordingly, the holder 20 can be supported more stably as compared with the case where the preload unit 40 is disposed only on one side of the holder 20.

Specifically, the axial protrusions 45 of the pair of preload units 40 come into contact with the pair of axial recesses 22b of the holder 20. The holder 20 is supported by the preload unit 40 from both sides in the axial direction of the first swing axis A1 at two contact points in contact with the axial protrusion 45. Accordingly, the holder 20 can swing about the first swing axis A1 passing through the two contact points.

The preload unit 40 further includes the protrusion 46. The protrusion 46 is disposed on one of the first surface 41 and the second surface 42, and protrudes toward one of the holder 20 and the first support 30. In the embodiment, the protrusion 46 is disposed on the first surface 41 similarly to the axial protrusion 45. The protrusion 46 protrudes toward the holder 20 in the direction along the first swing axis A1. The protrusion 46 is provided corresponding to the restriction recess 22c. For example, four protrusions 46 are provided in each preload unit 40. A part of the protrusion 46 is accommodated in the restriction recess 22c. The protrusion 46 is disposed so as to surround the axial protrusion 45. In other words, the axial protrusion 45 is disposed inside a region containing the four protrusions 46. For example, the number of protrusions 46 may be 1 to 3, or at least 5. The protrusion 46 is formed by bending the end of the first surface 41.

The preload unit 40 includes an attachment unit 47. For example, the attachment unit 47 is disposed on the second surface 42. The attachment unit 47 is disposed at the upper end of the second surface 42. The attachment unit 47 is attached on the upper end of the side surface unit 32 of the first support 30. For example, the attachment unit 47 is attached to the side surface unit 32 by pinching the upper end of the side surface unit 32 in the first direction X. The preload unit 40 needs not to include the attachment unit 47, and for example, may be fixed to the first support 30 using an adhesive or the like.

Figure 9:
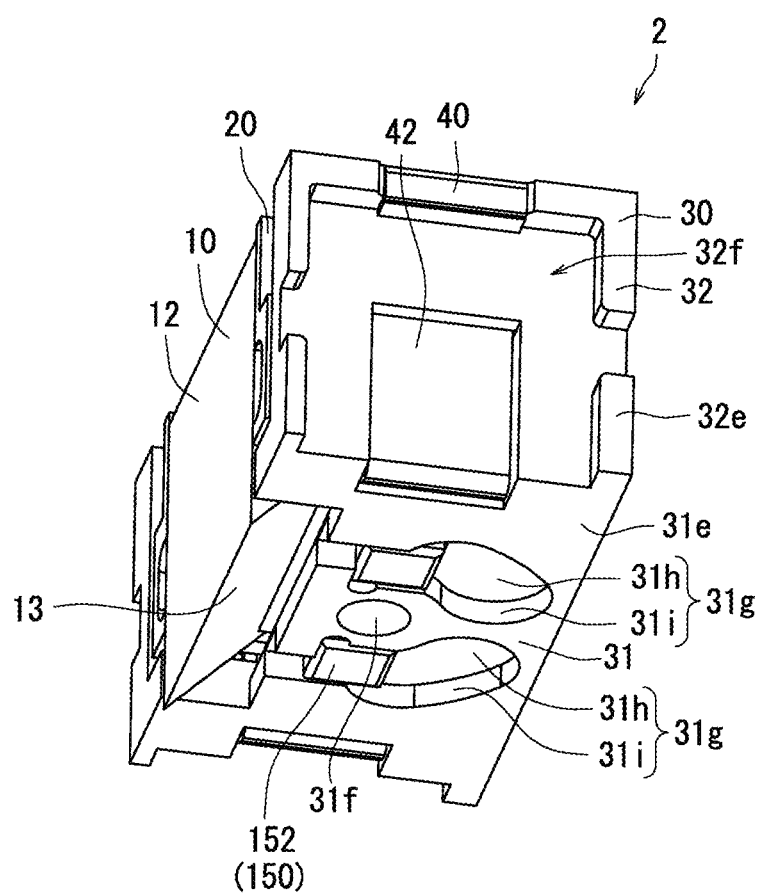
FIG. 9 is a perspective view illustrating the movable body of the optical unit of the embodiment.
Figure 9:
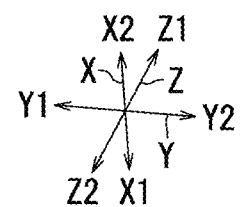
Figure 10:
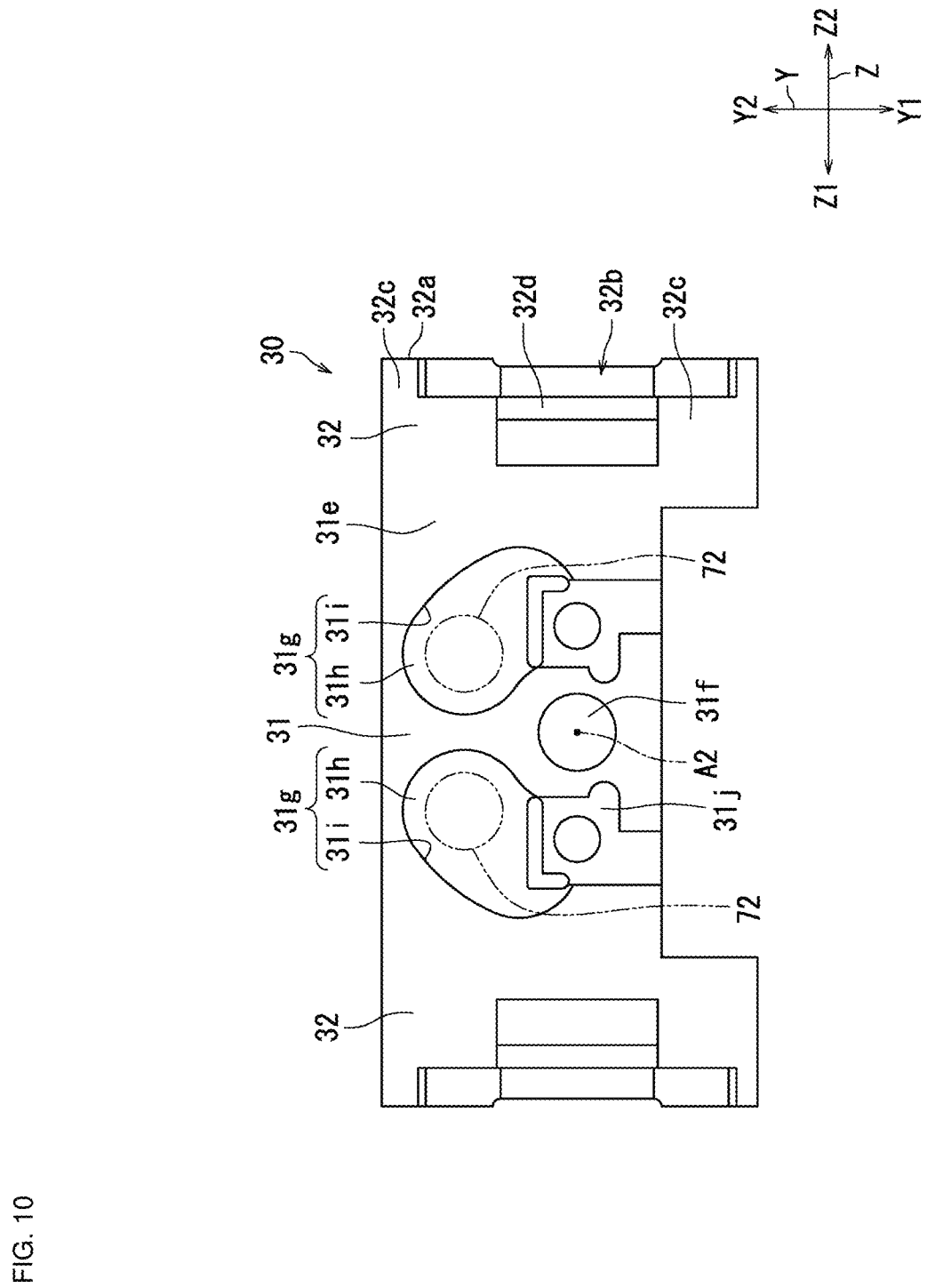
FIG. 10 is a view illustrating the first support of the optical unit of the embodiment as viewed from one side X1 in a first direction X.
Figure 11:
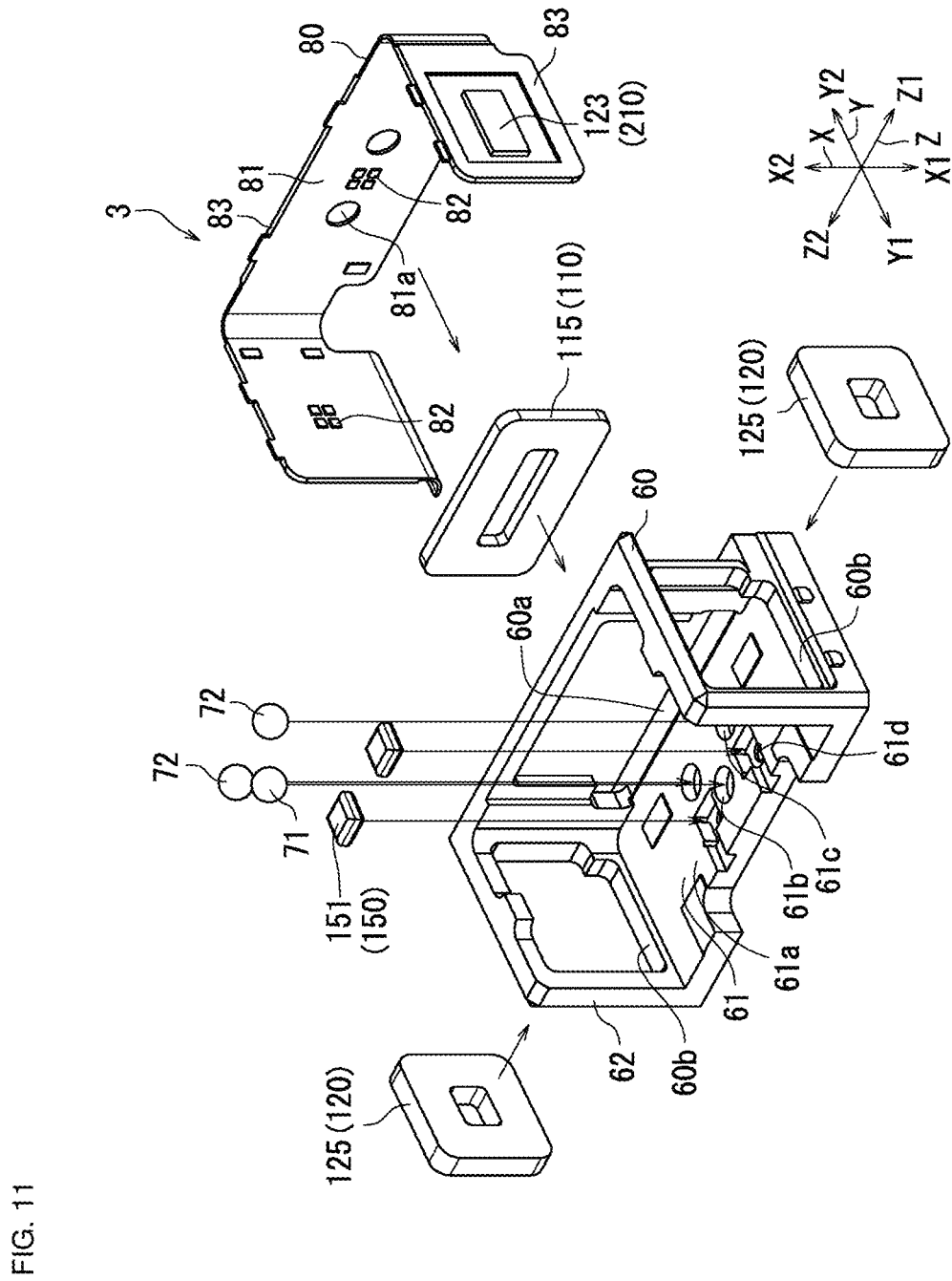
FIG. 11 is an exploded perspective view illustrating the support body of the optical unit of the embodiment.
Figure 12:
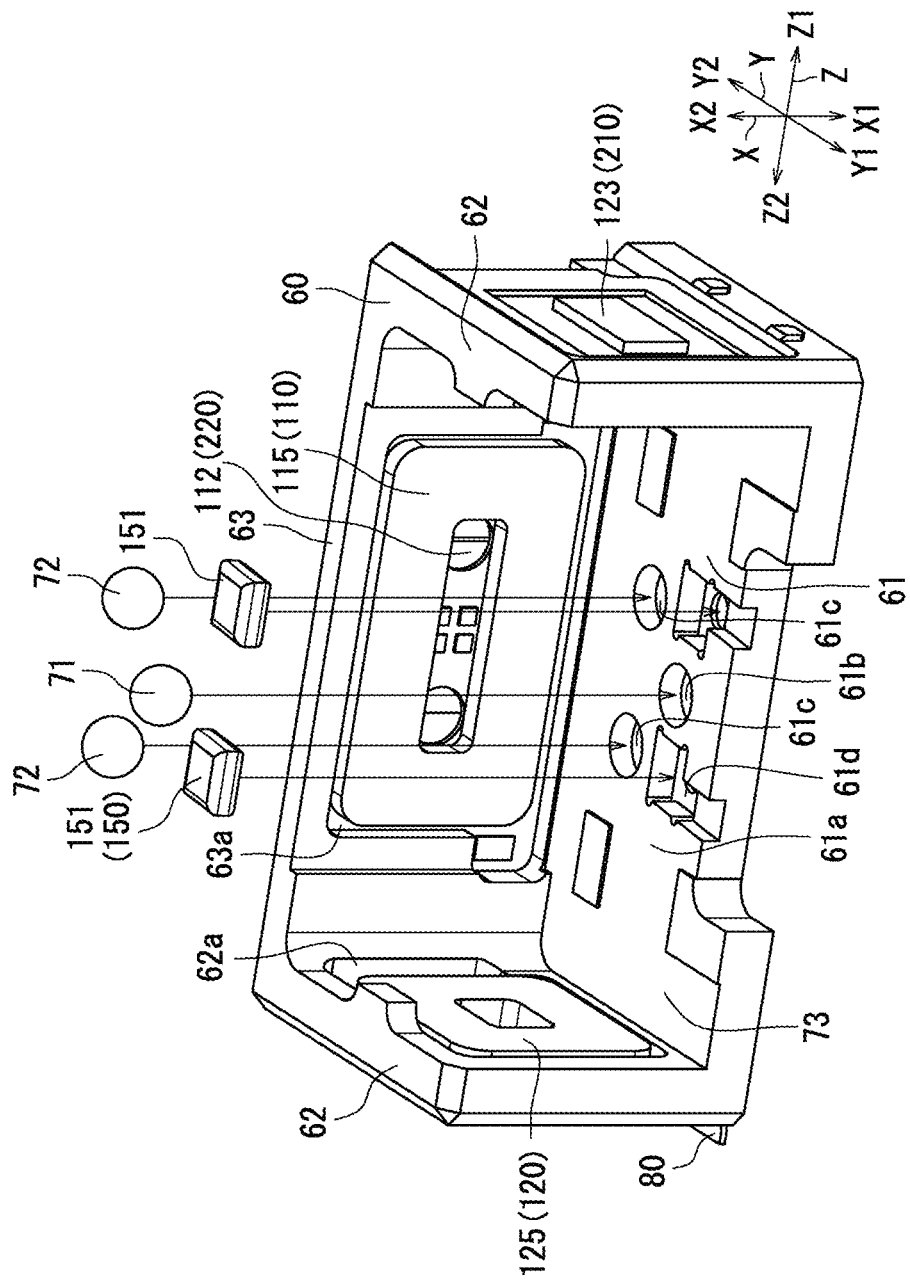
FIG. 12 is a perspective view illustrating a periphery of a second support in the optical unit of the embodiment.

FIG. 9 is a perspective view illustrating the movable body 2 of the optical unit 1 of the embodiment. FIG. 10 is a view illustrating the first support 30 of the optical unit 1 of the embodiment as viewed from one side X1 in the first direction X. FIG. 11 is an exploded perspective view illustrating the support body 3 of the optical unit 1 of the embodiment. FIG. 12 is a perspective view illustrating a periphery of the second support 60 in the optical unit 1 of the embodiment.

As illustrated in FIGS. 9 to 12, one of the movable body 2 and the support body 3 includes a first protrusion 71 protruding toward the other of the movable body 2 and the support body 3. Specifically, one of the first support 30 and the second support 60 includes the first protrusion 71 protruding toward the other of the first support 30 and the second support 60. The other of the movable body 2 and the support body 3 comes into contact with the first protrusion 71. The first protrusion 71 is disposed on the second swing axis A2. Accordingly, the movable body 2 swings about the first protrusion 71. Consequently, the length from the contact position between the movable body 2 and the support body 3 to the swing center can be reduced. Because the force required to swing the movable body 2 is a product of the length from the contact position to the swing center and frictional force, the force required to swing the movable body 2 can be reduced by disposing the first protrusion 71 on the second swing axis A2. That is, the force required to drive the optical unit 1 can be reduced. The material of the first protrusion 71 is not particularly limited, but for example, the first protrusion 71 is formed of ceramic, resin, or metal.

The first protrusion 71 is disposed on the second swing axis A2, so that the contact position between the movable body 2 and the support body 3 does not move with respect to the first protrusion 71. Accordingly, the frictional force between the other of the movable body 2 and the support body 3 and the first protrusion 71 can be reduced, for example, as compared with the case where the other of the movable body 2 and the support body 3 swings with respect to the first protrusion 71 when the movable body 2 swings. The optical axis L10 and the second swing axis A2 are disposed to overlap each other, so that the optical axis L10 can be prevented from deviating from the second swing axis A2 when the movable body 2 is swung.

In the embodiment, the support body 3 includes the first protrusion 71. Accordingly, the first protrusion 71 can be prevented from rotating when the movable body 2 swings. Consequently, the movable body 2 can be stably supported by the first protrusion 71. As a result, the swing of the movable body 2 is stabilized.

One of the movable body 2 and the support body 3 includes a plurality of second protrusions 72 protruding toward the other of the movable body 2 and the support body 3. Specifically, one of the first support 30 and the second support 60 includes the plurality of second protrusions 72 protruding toward the other of the first support 30 and the second support 60. The plurality of second protrusions 72 are disposed at positions separated from the second swing axis A2. The other of the movable body 2 and the support body 3 comes into contact with the plurality of second protrusions 72. The first protrusion 71 and the plurality of second protrusions 72 are disposed on the same plane intersecting the second swing axis A2. Accordingly, the movable body 2 can be supported by the first protrusion 71 and the plurality of second protrusions 72 disposed on the same plane. As a result, the movable body 2 can be stably supported. Examples of the same plane on which the first protrusion 71 and the plurality of second protrusions 72 are disposed include a plane including an opposing surface 61a and a plane including a lower opposing surface 31e. The material of the second protrusion 72 is not particularly limited, but for example, the second protrusion 72 is formed of ceramic, resin, or metal.

The position of the second protrusion 72 is constant. In other words, the second protrusion 72 does not move with respect to one of the movable body 2 and the support body 3. In the embodiment, the second protrusion 72 does not move with respect to the support body 3. In other words, in the embodiment, the position of the second protrusion 72 with respect to the support body 3 is constant even when the movable body 2 swings. Accordingly, the movable body 2 can be supported more stably.

In the embodiment, the number of second protrusions 72 is two. Accordingly, the movable body 2 is supported by three protrusions (first protrusion 71 and second protrusions 72), so that the movable body 2 can be supported more stably as compared with the case where the movable body 2 is supported by at least four protrusions. In the embodiment, the movable body 2 is in point contact at three points, so that the movable body 2 can be supported more stably.

The other of the movable body 2 and the support body 3 includes a first recess 31f recessed in the direction opposite to the first protrusion 71. The first recess 31f comes into contact with the first protrusion 71.

Accordingly, the center of the first protrusion 71 can be prevented from deviating from the center axis of the first recess 31f by receiving the first protrusion 71 at the first recess 31f having the recessed shape. As a result, the image blur due to deviation of the center of rotation can be prevented. The swing of the movable body 2 can be prevented from becoming unstable due to the deviation of the rotation center. As a result, for example, the current value required to swing can be prevented from fluctuating.

In the embodiment, the movable body 2 includes the first recess 31f, and the support body 3 includes the first protrusion 71. Accordingly, when the first protrusion 71 has the sphere, the movable body 2 can be assembled to the support body 3 while the sphere is disposed on the second support 60, so that the assembly work can be facilitated.

With reference to FIGS. 8 and 9, the structure around the first support 30 will be described in detail below. As illustrated in FIGS. 8 and 9, the first support 30 includes a support main body 31 and a pair of side surface units 32. The pair of side surface units 32 is disposed on both sides of the holder 20 in the axial direction of the first swing axis A1. The support main body 31 connects the pair of side surface units 32.

The support main body 31 includes an upper opposing surface 31a. The upper opposing surface 31a is opposite to the holder 20 in the first direction X. The upper opposing surface 31a is separated from the bottom surface of the holder 20.

The pair of side surface units 32 is disposed at both ends of the support main body 31 in the third direction Z. The pair of side surface units 32 has the shapes symmetrical to each other in the third direction Z. The side surface unit 32 includes an inner side surface 32a. The inner side surface 32a is opposite to the holder 20 in the third direction Z.

One of the first support 30 and the holder 20 includes an attachment groove 32b. The attachment groove 32b is recessed toward the side opposite to the other of the first support 30 and the holder 20 on the first swing axis A1. Accordingly, the holder 20 and the preload unit 40 can be easily attached to the first support 30 by moving the preload unit 40 along the attachment groove 32b. In the embodiment, the first support 30 includes the attachment groove 32b. The attachment groove 32b is recessed toward the side opposite to the holder 20 on the first swing axis A1. The attachment groove 32b accommodates at least a part of the preload unit 40 and extends in the direction intersecting the first swing axis A1.

In the embodiment, the attachment groove 32b is disposed in the inner side surface 32a. The attachment groove 32b accommodates a part of the preload unit 40. The attachment groove 32b extends in the first direction X.

Each side surface unit 32 includes a pair of columns 32c and a connection unit 32d. The pair of columns 32c is separated from each other in the second direction Y. The column 32c extends in the first direction X. The connection unit 32d connects upper portions of the columns 32c to each other. The length of the connection unit 32d in the third direction Z is shorter than the length of the column 32c in the third direction Z. The attachment groove 32b is formed by the pair of columns 32c and the connection unit 32d.

The preload unit 40 can move along the attachment groove 32b. In the embodiment, the preload unit 40 can move in the first direction X along the attachment groove 32b. The attachment unit 47 of the preload unit 40 pinches the connection unit 32d in the third direction Z by moving the preload unit 40 along the attachment groove 32b. Consequently, the preload unit 40 is fixed to the first support 30.

The side surface unit 32 includes an outer side surface 32e and an accommodation recess 32f. The outer side surface 32e faces the outside of the third direction Z. The accommodation recess 32f is disposed on the outer side surface 32e. The accommodation recess 32f accommodates at least a part of second magnets 121 of the second swing mechanism 120. The side surface unit 32 includes a pair of notches 32g. The notch 32g is disposed at the end in the second direction Y of the accommodation recess 32f. A projection 122a of a magnet support plate 122 is disposed in the notch 32g. The magnet support plate 122 supports the second magnet 121. The notch 32g supports the magnet support plate 122. The material of the magnet support plate 122 is not particularly limited, but for example, a magnetic material may be used. In this case, the magnet support plate 122 is also called a back yoke. Magnetic leakage can be prevented using the magnet support plate 122 made of a magnetic material.

The other of the movable body 2 and the support body 3 includes a second recess 31g. In the embodiment, the movable body 2 includes the second recess 31g.

Specifically, the support main body 31 includes the lower opposing surface 31e, the first recess 31f, and the second recess 31g. The lower opposing surface 31e is opposite to the support body 3 in the first direction X. The first recess 31f and the second recess 31g are disposed on the lower opposing surface 31e.

The first recess 31f is disposed on the second swing axis A2. The first recess 31f has a part of a recessed spherical surface. Accordingly, because the first protrusion 71 is received by the recessed spherical surface, for example, the first protrusion 71 is less likely to laterally deviate in the first recess 31f. As a result, the movable body 2 can be stably supported. On the other hand, for example, when the first recess 31f has a rectangular cross section, the first protrusion 71 tends to laterally deviate with respect to the first recess 31f. In the embodiment, for example, unlike the case where the first protrusion 71 and the first recess 31f have the rectangular cross section, the first protrusion 71 and the first recess 31f can be easily brought into point contact.

The second recess 31g is recessed in the direction opposite to the second protrusion 72. The second recess 31g is separated from the first recess 31f. That is, the second recess 31g is separated from the second swing axis A2. A plurality of second recesses 31g are provided. In the embodiment, two second recesses 31g are provided. The two second recesses 31g are disposed at equal distances to the second swing axis A2. The second recess 31g includes a sliding surface 31h and an inner side surface 31i.

The second recess 31g comes into contact with the second protrusion 72. Specifically, the sliding surface 31h of the second recess 31g comes into contact with the second protrusion 72. The sliding surface 31h is disposed substantially parallel to the lower opposing surface 31e. That is, a depth of the second recess 31g is substantially constant.

As illustrated in FIG. 10, a contour of the second recess 31g is disposed outside the second protrusion 72 as viewed from the optical axis direction. Accordingly, the second protrusion 72 can be prevented from coming into contact with the inner side surface 31i of the second recess 31g. As a result, friction between the second protrusion 72 and the second recess 31g can be prevented. Specifically, the inner side surface 31i surrounds the sliding surface 31h. The inner side surface 31i is separated from the second protrusion 72. That is, as viewed from the optical axis direction, the contour of the second recess 31g is separated with respect to the second protrusion 72. The inner side surface 31i is disposed at a position where the second protrusion 72 does not come into contact when the first support 30 is swung by the second swing mechanism 120 about the second swing axis A2.

As illustrated in FIGS. 3 and 5A, the second protrusion 72 is disposed on the other side Y2 in the second direction Y relative to the first recess 31f. Accordingly, the second protrusion 72 can be prevented from coming into contact with the reflection surface 13 of the optical element 10. As a result, a space where the optical element 10 is disposed can be easily secured. The larger optical element 10 can also be mounted. Specifically, a part of the reflection surface 13 protrudes toward one side X1 in the first direction X and one side Y1 in the second direction Y with respect to the lower opposing surface 31e. Accordingly, the optical element 10 can be prevented from coming into contact with a part of the first support 30 where the second protrusion 72 is disposed. As a result, the space where the optical element 10 is disposed can be easily secured.

As illustrated in FIGS. 11 and 12, the support body 3 includes the second support 60, the first protrusion 71, and the second protrusion 72. The support body 3 preferably includes the opposing surface 61a.

Specifically, the second support 60 supports the first support 30 while being swingable about the second swing axis A2 intersecting the first swing axis A1. The second support 60 supports the first support 30 in the first direction X. That is, the second support 60 supports the movable body 2 in the first direction X. Accordingly, a change in the position of the optical element 10 can be prevented in the first direction X, so that a change in the position of the reflected light (the light L emitted from the optical element 10) can be prevented in the first direction X.

Figure 13:
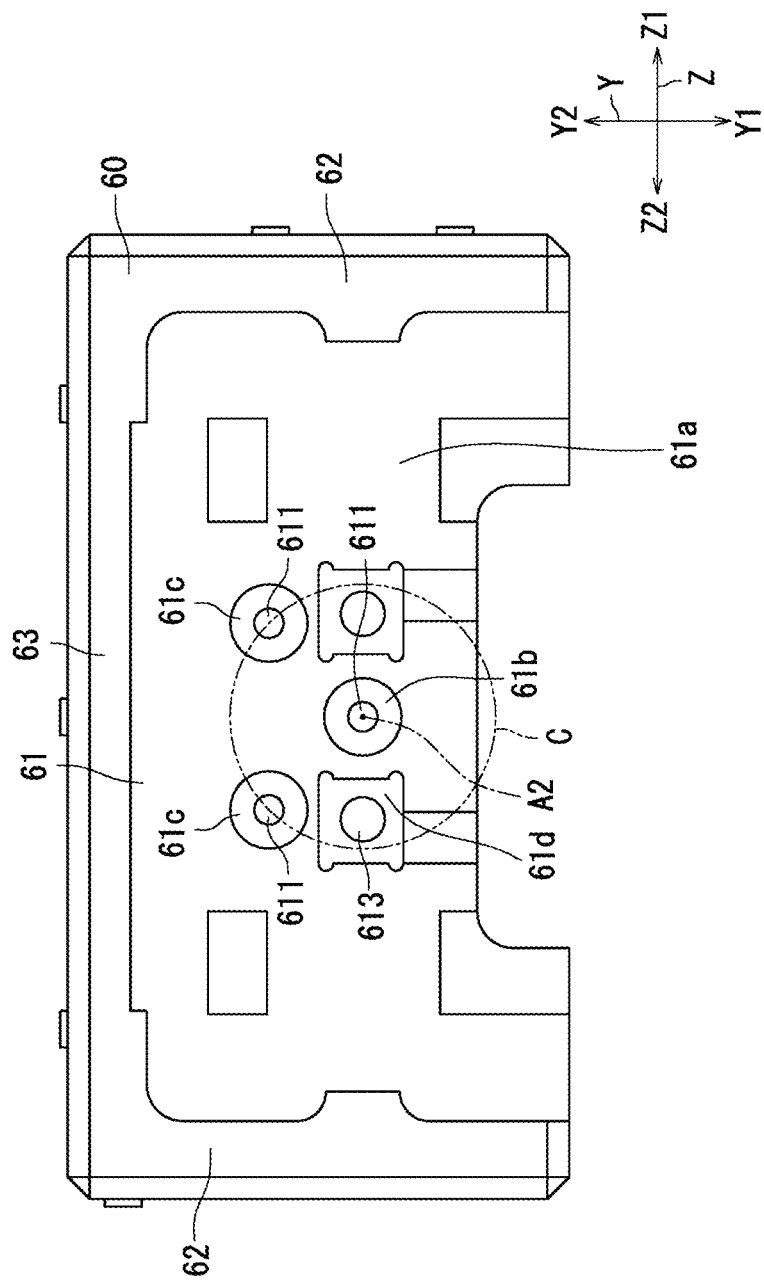
FIG. 13 is a view illustrating the second support of the optical unit of the embodiment as viewed from the other side X2 in the first direction X.

FIG. 13 is a view illustrating the second support 60 of the optical unit 1 of the embodiment as viewed from the other side X2 in the first direction X. As illustrated in FIGS. 11 and 13, the second support 60 includes a support main body 61, a pair of side surface units 62, and a back surface unit 63. The support main body 61 includes the opposing surface 61a, a first accommodation recess 61b, and at least two second accommodation recesses 61c. In the embodiment, the support main body 61 includes one first accommodation recess 61b and two second accommodation recesses 61c. In the embodiment, an example in which the second support 60 includes the first accommodation recess 61b and the second accommodation recess 61c will be described. However, one of the movable body 2 and the support body 3 may include the first accommodation recess and the second accommodation recess that are recessed in the direction opposite to the other of the movable body 2 and the support body 3. For example, one of the movable body 2 and the support body 3 may include the first accommodation recess, and the other of the movable body 2 and the support body 3 may include the second accommodation recess.

The opposing surface 61a is opposite to the lower opposing surface 31e of the first support 30 in the first direction X. The first accommodation recess 61b and the second accommodation recess 61c are disposed on the opposing surface 61a. The first accommodation recess 61b and the second accommodation recess 61c are recessed in the direction opposite to the movable body 2 in the first direction X. That is, the first accommodation recess 61b and the second accommodation recess 61c are recessed to one side X1 in the first direction X. The first accommodation recess 61b is opposite to the first recess 31f of the first support 30 in the first direction X. The first accommodation recess 61b is disposed on the same circumference C (see FIG. 13) about the second swing axis A2. The first accommodation recess 61b accommodates a part of the first protrusion 71. Accordingly, the first protrusion 71 is disposed on the second swing axis A2.

The second accommodation recess 61c is separated from the first accommodation recess 61b. Accordingly, the second accommodation recess 61c is separated from the second swing axis A2. In the embodiment, the second accommodation recess 61c is separated at a distance from the first accommodation recess 61b. The second accommodation recess 61c accommodates a part of the second protrusion 72. Accordingly, the plurality of second protrusions 72 are disposed on the same circumference C about the second swing axis A2. Accordingly, the movable body 2 can be supported at a position with an equal distance from the first protrusion 71. As a result, the movable body 2 can be supported more stably. The axial direction of the second swing axis A2 is the direction along the first direction X.

The two second accommodation recesses 61c are disposed at positions farther to the optical element 10 relative to the first accommodation recess 61b while arranged in the third direction Z.

The first accommodation recess 61b holds a part of the first protrusion 71. In the embodiment, the lower half of the first protrusion 71 is disposed in the first accommodation recess 61b. The first protrusion 71 includes at least a part of a spherical surface. Accordingly, the first protrusion 71 comes into point contact with the other of the movable body 2 and the support body 3, so that the frictional force between the first protrusion 71 and the other of the movable body 2 and the support body 3 can be reduced. In the embodiment, the first protrusion 71 comes into point contact with the movable body 2, so that the frictional force between the first protrusion 71 and the movable body 2 can be reduced.

In the embodiment, the first protrusion 71 is a sphere. Accordingly, the friction between the first protrusion 71 and the first recess 31f becomes rolling friction. As a result, an increase in the frictional force between the first protrusion 71 and the first recess 31f can be prevented. Specifically, the first protrusion 71 can rotate in the first accommodation recess 61b. Accordingly, the friction between the first protrusion 71 and the first recess 31f becomes the rolling friction. The first protrusion 71 may be fixed to the first recess 31f by using, for example, an adhesive.

The second accommodation recess 61c holds a part of the second protrusion 72. In the embodiment, the lower half of the second protrusion 72 is disposed in the second accommodation recess 61c. The second protrusion 72 includes at least a part of a spherical surface. Accordingly, the second protrusion 72 comes into point contact with the other of the movable body 2 and the support body 3, so that the frictional force between the second protrusion 72 and the other of the movable body 2 and the support body 3 can be reduced. In the embodiment, the second protrusion 72 is in point contact with the movable body 2, so that the frictional force between the second protrusion 72 and the movable body 2 can be reduced.

In the embodiment, the second protrusion 72 is a sphere. Accordingly, the friction between the second protrusion 72 and the other of the movable body 2 and the support body 3 becomes the rolling friction, so that the frictional force can be prevented. In the embodiment, the friction between the second protrusion 72 and the movable body 2 becomes the rolling friction. Specifically, the second protrusion 72 can rotate in the second accommodation recess 61c. Accordingly, the friction between the second protrusion 72 and the second recess 31g of the first support 30 becomes the rolling friction. The second protrusion 72 may be fixed to the second recess 31g by using, for example, an adhesive.

As illustrated in FIGS. 5C and 13, the first accommodation recess 61b may include a center recess 611. The center recess 611 is disposed on the same circumference with the first accommodation recess 61b. The first protrusion 71 comes into contact with the edge of the center recess 611. A diameter of the center recess 611 is smaller than a diameter of the first protrusion 71. Accordingly, for example, even when a gap is generated between the outer peripheral surface of the first protrusion 71 and the inner peripheral surface of the first accommodation recess 61b, the first protrusion 71 can be positioned by the center recess 611. That is, the center of the first protrusion 71 can be disposed on the center axis of the center recess 611. As a result, the center of the first protrusion 71 can be easily disposed on the center axis of the first accommodation recess 61b.

As illustrated in FIGS. 5D and 13, the second accommodation recess 61c may include the center recess 611. The center recess 611 is disposed on the same circumference with the second accommodation recess 61c. The second protrusion 72 comes into contact with the edge of the center recess 611. The diameter of the center recess 611 is smaller than the diameter of the second protrusion 72. Accordingly, for example, even when the gap is generated between the outer peripheral surface of the second protrusion 72 and the inner peripheral surface of the second accommodation recess 61c, the second protrusion 72 can be positioned by the center recess 611. That is, the center of the second protrusion 72 can be disposed on the center axis of the center recess 611. As a result, the center of the second protrusion 72 can be easily disposed on the center axis of the second accommodation recess 61c.

The materials of the first protrusion 71 and the second protrusion 72 are ceramic. Accordingly, it is possible to suppress the first protrusion 71 and the second protrusion 72 can be prevented from becoming worn. The materials of the first protrusion 71 and the second protrusion 72 may be metal. Also in this case, the first protrusion 71 and the second protrusion 72 can be prevented from becoming worn. The entire first protrusion 71 and entire second protrusion 72 may be formed of metal, or for example, only the surfaces of the first protrusion 71 and the second protrusion 72 may be formed of metal by plating. The first protrusion 71 and the second protrusion 72 may be formed of resin.

The first protrusion 71 is disposed on one side X1 in the first direction X with respect to the reflection surface 13 (see FIG. 5A) of the optical element 10. Accordingly, the first protrusion 71 can be disposed without blocking the light path.

As illustrated in FIGS. 5C, 8, and 11, the optical unit 1 includes a third attraction mechanism 150 disposed in one of the movable body 2 and the support body 3. In the embodiment, the optical unit 1 includes a pair of third attraction mechanisms 150. In the embodiment, the third attraction mechanism 150 includes a magnet 151 disposed in one of the movable body 2 and the support body 3 and a magnetic member 152 disposed in the other of the movable body 2 and the support body 3. In the embodiment, the magnet 151 is an example of the "third attraction magnet" of the present disclosure. The magnetic member 152 is an example of the "third attraction magnetic member" of the present disclosure. The magnetic member 152 is a plate-like member made of a magnetic material. Specifically, the magnet 151 and the magnetic member 152 overlap each other as viewed from the direction (first direction X) in which the support body 3 supports the movable body 2. Accordingly, the attraction force can be generated between the magnet 151 and the magnetic member 152 in the direction in which the support body 3 supports the movable body 2.

As described above, because the magnet 151 and the magnetic member 152 overlap each other, the force acts between the movable body 2 and the support body 3 in the direction approaching each other. In other words, the attractive force acts on the movable body 2 and the support body 3. Accordingly, when the first swing mechanism 110 and the second swing mechanism 120 are not driven, the movable body 2 is held at the reference position by the attractive force between the magnet 151 and the magnetic member 152. As illustrated in FIG. 5B, the reference position is a position where the side surface unit 32 of the first support 30 and the side surface unit 62 of the second support 60 become parallel to each other. In addition, the movable body 2 can be prevented from moving to the other side X2 in the first direction X due to the attractive force generated between the magnet 151 and the magnetic member 152. Each of the magnet 151 and the magnetic member 152 is symmetrically disposed about the second swing axis A2 in the third direction Z. Accordingly, because the attractive force acts symmetrically about the second swing axis A2, the swing of the movable body 2 is stabilized. The center of the magnet 151 and the center of the magnetic member 152 are disposed at the same position as the first swing axis A1 in the second direction Y.

At least a part of one of the magnet 151 and the magnetic member 152 is disposed inside at least one of the movable body 2 and the support body 3. In the embodiment, the magnet 151 is disposed in the support body 3. The magnetic member 152 is disposed in the movable body 2.

Specifically, the movable body 2 includes an accommodation unit 31j in which the magnetic member 152 is disposed. In the embodiment, the first support 30 includes a pair of accommodation units 31j. The accommodation unit 31j is disposed on the lower opposing surface 31e of the support main body 31. The accommodation unit 31j is recessed from the lower opposing surface 31e toward the other side X2 in the first direction X. The magnetic member 152 is fitted in the accommodation unit 31j. Accordingly, the magnetic member 152 is fixed to the accommodation unit 31j. For example, the magnetic member 152 is fixed to the accommodation unit 31j by an adhesive or press-fitting.

The support body 3 includes a third accommodation recess 61d in which the magnet 151 is disposed. In the embodiment, the second support 60 includes a pair of third accommodation recesses 61d. The third accommodation recess 61d is disposed on the opposing surface 61a of the support main body 61. The third accommodation recess 61d is recessed from the opposing surface 61a toward the one side X1 in the first direction X. The magnet 151 is fitted in the third accommodation recess 61d. Accordingly, the magnet 151 is fixed to the third accommodation recess 61d. For example, the magnet 151 is fixed to the third accommodation recess 61d by an adhesive or press-fitting.

As illustrated in FIGS. 12 and 13, in the second support 60, the pair of side surface units 62 are disposed at both ends in the third direction Z of the support main body 61. The pair of side surface units 62 have shapes symmetrical to each other in the third direction Z. The side surface unit 62 includes an accommodation hole 62a in which a second coil 125 of the second swing mechanism 120 is disposed. The accommodation hole 62a penetrates the side surface unit 62 in the thickness direction. That is, the accommodation hole 62a penetrates the side surface unit 62 in the third direction Z.

The back surface unit 63 is disposed at the end on the other side Y2 in the second direction Y of the support main body 61. The back surface unit 63 includes an accommodation hole 63a in which a first coil 115 of the first swing mechanism 110 is disposed. The accommodation hole 63a penetrates the back surface unit 63 in the thickness direction. That is, the accommodation hole 63a penetrates the back surface unit 63 in the second direction Y.

A flexible printed circuit (FPC) 80 is disposed so as to cover the outside of the pair of side surface units 62 and the outside of the back surface unit 63. For example, the FPC 80 includes a semiconductor element, a connection terminal, and a wiring. The FPC 80 supplies the power to the first coil 115 of the first swing mechanism 110 and the second coil 125 of the second swing mechanism 120 at predetermined timing.

Specifically, as illustrated in FIG. 11, the FPC 80 includes a substrate 81, a connection terminal 82, and a reinforcing plate 83. For example, the substrate 81 is made of a polyimide substrate. The substrate 81 has flexibility. The substrate 81 includes a plurality of pin insertion holes 81a. The pin insertion holes 81a are opposite to the first coil 115. A coil pin (not illustrated) of the first coil 115 is disposed in each pin insertion hole 81a.

The connection terminal 82 is disposed on the substrate 81. The connection terminal 82 is opposite to the first swing mechanism 110 and the second swing mechanism 120. The connection terminal 82 is electrically connected to a terminal of a Hall element (not illustrated). For example, four connection terminals 82 are disposed for one Hall element. Three reinforcing plates 83 are disposed on the substrate 81. The reinforcing plates 83 are opposite to the first swing mechanism 110 and the second swing mechanism 120. The reinforcing plate 83 prevents the substrate 81 from bending.

As illustrated in FIGS. 5A and 5B, the optical unit 1 further includes the first swing mechanism 110. The first swing mechanism 110 swings the holder 20 with respect to the first support 30 about the first swing axis A1. Accordingly, the optical element 10 can be easily swung about each of the two swing axes (the first swing axis A1 and the second swing axis A2). The first swing mechanism 110 includes the first magnet 111 and the first coil 115. The first coil 115 is opposite to the first magnet 111 in the second direction Y.

The first magnet 111 is disposed in one of the holder 20 and the second support 60. On the other hand, the first coil 115 is disposed in the other of the holder 20 and the second support 60. Accordingly, the force acts on the first magnet 111 due to a magnetic field generated when the current flows through the first coil 115. The holder 20 swings with respect to the first support 30. Thus, the holder 20 can be swung with a simple configuration using the first magnet 111 and the first coil 115. In the embodiment, the first magnet 111 is disposed in the holder 20. The first coil 115 is disposed on the second support 60. Because the first coil 115 is disposed on the second support 60, the first coil 115 does not swing with respect to the second support 60. Accordingly, wiring can be easily performed on the first coil 115, for example, as compared with the case where the first coil 115 is disposed on the first support 30.

Specifically, the first magnet 111 is disposed in the back surface 21*b* of the holder 20. That is, the first magnet 111 is disposed at an end 20*a* on the other side Y2 in the second direction Y of the holder 20. The first magnet 111 includes an n-pole unit 111*a* including an n-pole and an s-pole unit 111*b* including an s-pole. The first magnet 111 is polarized in the first direction X.

The first coil 115 is disposed in the accommodation hole 63*a* of the back surface unit 63 of the second support 60. That is, the first coil 115 is disposed at an end 60*a* on the other side Y2 in the second direction Y of the second support 60. Accordingly, the first coil 115 and the first magnet 111 can be prevented from being disposed on the light path. Thus, the light path can be prevented from being blocked by the first coil 115 and the first magnet 111.

When the first coil 115 is energized, the magnetic field is generated around the first coil 115. Then, the force caused by the magnetic field acts on the first magnet 111. As a result, the holder 20 and the optical element 10 swing about the first swing axis A1 with respect to the first support 30 and the second support 60.

The optical unit 1 further includes the second swing mechanism 120. The second swing mechanism 120 swings the movable body 2 with respect to the support body 3 about the second swing axis A2. Specifically, the second swing mechanism 120 swings the first support 30 about the second swing axis A2 with respect to the second support 60. The second swing mechanism 120 includes the second magnet 121 and the second coil 125 opposite to the second magnet 121. The second swing mechanism 120 is an example of the "second swing mechanism", "swing mechanism" of the present disclosure. The second coil 125 is an example of the "coil" of the present disclosure.

The second magnet 121 is disposed on the movable body 2 or the support body 3. The second coil 125 is disposed on the support body 3 or the movable body 2. In the embodiment, the second magnet 121 is disposed on one of the first support 30 and the second support 60. On the other hand, the second coil 125 is disposed on the other of the first support 30 and the second support 60. Accordingly, the first support 30 swings with respect to the second support 60 by the magnetic field generated when the current flows through the second coil 125. Thus, the first support 30 can be swung with a simple configuration using the second magnet 121 and the second coil 125. In the embodiment, the second magnet 121 is disposed on the first support 30. The second coil 125 is disposed on the second support 60. When the second coil 125 is disposed on the second support 60, the second coil 125 does not swing with respect to the second support 60. Accordingly, the wiring can be easily performed on the second coil 125, for example, as compared with the case where the second coil 125 is disposed on the first support 30.

Specifically, the second magnet 121 is disposed in the accommodation recess 32*f* (see FIG. 8) of the side surface unit 32 of the first support 30. That is, the second magnet 121 is disposed at an end 30*a* in the direction intersecting the first direction X of the first support 30. In the embodiment, the second magnet 121 is disposed at the end 30*a* of the third direction Z. The second magnet 121 includes an n-pole unit 121*a* including the n-pole and an s-pole unit 121*b* including the s-pole. The second magnet 121 is polarized in the second direction Y intersecting the first direction X. Accordingly, the movable body 2 can be swung about the second swing axis A2 along the incident direction of light.

The second coil 125 is opposite to the second magnet 121 in the third direction Z. The second coil 125 is disposed in the accommodation hole 62*a* (see FIG. 12) of the side surface unit 62 of the second support 60. That is, the second coil 125 is disposed at an end 60*b* of the second support 60 in the third direction Z.

When the second coil 125 is energized, the magnetic field is generated around the second coil 125. Then, the force caused by the magnetic field acts on the second magnet 121. As a result, the first support 30, the holder 20, and the optical element 10 swing about the second swing axis A2 with respect to the second support 60.

As described above, the optical unit 1 includes the first attraction mechanism 210. The first attraction mechanism 210 includes a second magnet 121 and a magnetic member 123. The magnetic member 123 is a plate-like member made of a magnetic material. The magnetic member 123 is disposed on the substrate 81. The magnetic member 123 is opposite to the second magnet 121. The attractive force is generated between the second magnet 121 and the magnetic member 123 while the second coil 125 is not energized. Thus, the movable body 2 is disposed at the reference position in a rotation direction about the second swing axis A2.

As described above, the optical unit 1 includes the second attraction mechanism 220. The second attraction mechanism 220 includes a first magnet 111 and a magnetic member 112. The magnetic member 112 is a plate-like member made of a magnetic material. The magnetic members 112 are disposed on the substrate 81. The magnetic member 112 is opposite to the first magnet 111. The attractive force is generated between the first magnet 111 and the magnetic member 112 while the first coil 115 is not energized. Thus, the movable body 2 is disposed at the reference position in a rotation direction about the first swing axis A1.

In the embodiment, the first swing mechanism 110 includes one of the second magnet 121 and the first magnet 111. The second swing mechanism 120 includes the other of the second magnet 121 and the first magnet 111. That is, the first swing mechanism 110 and the second swing mechanism 120 share the magnet with the first attraction mechanism 210 and the second attraction mechanism 220. Accordingly, an increase in the number of components of the magnet can be prevented. Specifically, the first swing mechanism 110 includes the first magnet 111. That is, the first magnet 111 is shared by the second attraction mechanism 220 and the first swing mechanism 110. The second swing mechanism 120 includes the second magnet 121. That is, the second magnet 121 is shared by the first attraction mechanism 210 and the second swing mechanism 120.

In the embodiment, as viewed from the first predetermined direction, the center 0123 of the magnetic member 123 is disposed on one side in the second predetermined direction with respect to a center 0125 of the second coil 125. The magnetic member 123 of the first attraction mechanism 210 is disposed on the side opposite to the movable body 2 with respect to the second coil 125. Specifically, the second coil 125 is disposed in an inner surface 80*a* of the FPC 80. The magnetic member 123 is disposed in the outer surface 80*b* of the FPC 80. The inner surface 80*a* is a surface facing the side of the movable body 2. The outer surface 80*b* is a surface facing the side opposite to the movable body 2. The outer surface 80b is a surface facing the outside of the optical unit 1. As described above, the magnetic member 123 is disposed on the side opposite to the movable body 2 with respect to the second coil 125, so that the magnetic member 123 can be prevented from interfering with the second coil 125. Accordingly, regardless of the position or size of the second coil 125, the center 0123 of the magnetic member 123 can be disposed on one side in the second predetermined direction with respect to the center 0121 of the second magnet 121. In the embodiment, the size in the second predetermined direction of the magnetic member 123 is larger than the size in the second predetermined direction of a hollow portion of the second coil 125.

In the embodiment, the second magnet 121 and the magnetic member 123 of the first attraction mechanism 210, and the first magnet 111 and the magnetic member 112 of the second attraction mechanism 220 are disposed on the same plane parallel to the first predetermined direction and the second predetermined direction. Accordingly, the attraction force of the first attraction mechanism 210 and the second attraction mechanism 220 with respect to the movable body 2 can be prevented from acting in the direction intersecting the first predetermined direction and the second predetermined direction. Specifically, for example, the same plane parallel to the first predetermined direction and the second predetermined direction is a plane orthogonal to the first direction X. Then, the attraction force of the first attraction mechanism 210 and the second attraction mechanism 220 with respect to the movable body 2 can be prevented from acting in the first direction X.

As described above, in the embodiment, the optical unit 1 includes the third attraction mechanism 150. The third attraction mechanism 150 generates the attraction force along a third predetermined direction in the movable body 2. The third predetermined direction is a direction intersecting the first predetermined direction and the second predetermined direction. In the embodiment, the third predetermined direction is the first direction X. As described above, the movable body 2 can be prevented from being displaced in the third predetermined direction by providing the third attraction mechanism 150 that generates the attraction force along the third predetermined direction in the movable body 2. In the embodiment, the movable body 2 can be prevented from being displaced in the first direction X.

As described above, the third attraction mechanism 150 includes the magnet 151 and the magnetic member 152. Accordingly, unlike the case where the third attraction mechanism 150 is formed of an elastic member such as a tension spring, the third attraction mechanism 150 can be easily attached to the movable body 2 and the support body 3.

When the optical unit 1 is used for the smartphone 200 as illustrated in FIG. 1, a Hall element (not illustrated) in the smartphone 200 detects the attitude of the smartphone 200. Then, the first swing mechanism 110 and the second swing mechanism 120 are controlled in response to the attitude of the smartphone 200.

Preferably, the optical unit 1 can detect the attitude of the holder 20 with respect to the second support 60. In this case, the attitude of the holder 20 can be controlled with high accuracy with respect to the second support 60. For example, a gyro sensor may be used as a sensor that detects the attitude of the smartphone 200.

Figure 14:
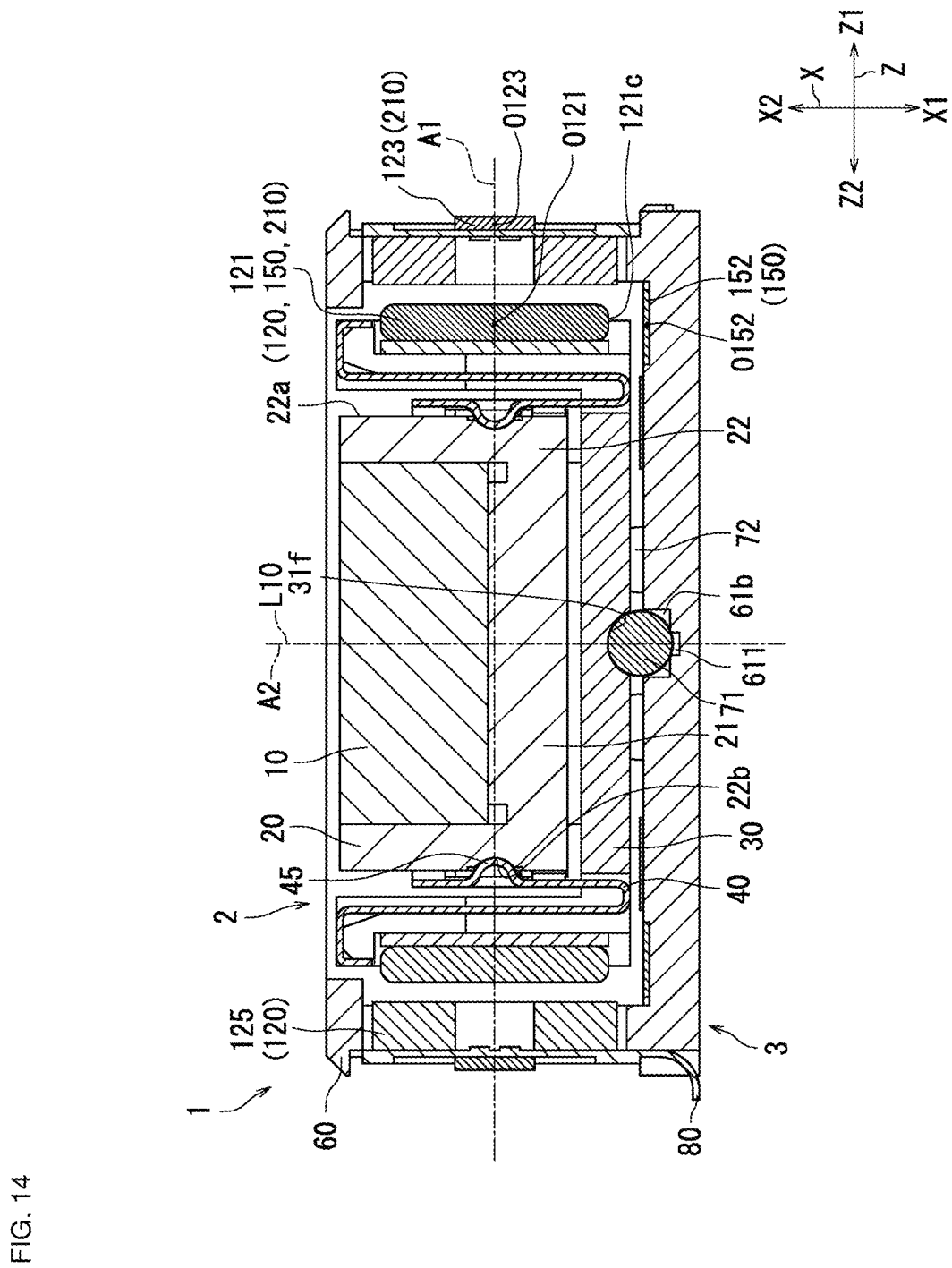
FIG. 14 is a sectional view illustrating a structure of an optical unit according to a modification of the embodiment.

With reference to FIG. 14, a modification of the embodiment will be described below. Hereinafter, differences from the embodiment illustrated in FIGS. 1 to 13 will be mainly described.

With reference to FIG. 14, the modification of the embodiment of the present disclosure will be described. FIG. 14 is a sectional view illustrating a structure of the optical unit 1 according to the modification of the embodiment. In the modification of FIG. 14, unlike the embodiment in FIGS. 1 to 13, an example in which the second magnet 121 (first attraction magnet) is also used as the third attraction mechanism 150 will be described.

As illustrated in FIG. 14, at least one of the second magnet 121 (first attraction magnet), the first magnet 111 (second attraction magnet), and the magnet 151 (third attraction magnet) is shared by at least two of the first attraction mechanism 210, the second attraction mechanism 220, and the third attraction mechanism 150. Accordingly, an increase in the number of components of the magnet can be prevented.

In the modification of FIG. 14, the second magnet 121 is also used as the first attraction mechanism 210 and the third attraction mechanism 150. Specifically, the third attraction mechanism 150 includes the second magnet 121 and the magnetic member 152. The magnetic member 152 is disposed in the support body 3. The magnetic member 152 is disposed on one side X1 in the first direction X with respect to the second magnet 121. The magnetic member 152 faces the second magnet 121. The magnetic member 152 faces a side surface 121c of the second magnet 121. The side surface 121c is a surface on one side X1 in the first direction X in the second magnet 121. When the attractive force is generated between the second magnet 121 and the magnetic member 152, the force acts on one side X1 in the first direction X in the movable body 2. In the modification of FIG. 14, the magnet 151 is not provided.

The center 0152 of the magnetic member 152 and the center 0121 of the second magnet 121 are disposed at the same position in the third direction Z. The center 0152 of the magnetic member 152 and the center 0121 of the second magnet 121 are disposed at the same position as the first swing axis A1 in the second direction Y.

The embodiment (including modifications) of the present disclosure has been described above with reference to the drawings. However, the present disclosure is not limited to the above-described embodiment, and can be implemented in various modes without departing from a gist thereof. Various disclosures can be formed by appropriately combining the plurality of components disclosed in the above embodiment. For example, some components may be removed from all components illustrated in the embodiment. For example, constituent elements described in different embodiments may be appropriately combined. The components in the drawings are mainly and schematically illustrated for facilitating better understanding, and the thickness, length, number, interval, and the like of each illustrated component may be different from reality for the convenience of creating drawings. The material, shape, dimensions, and the like of each component described in the above embodiment are merely examples and are not particularly limited, and various modifications can be made without substantially departing from the effects of the present disclosure.

In the embodiment, the example in which the first predetermined direction is the third direction Z has been illustrated. However, the present disclosure is not limited to this. For example, the first predetermined direction may be the first direction X or the second direction Y.

Furthermore, in the embodiment, the example in which the movable body 2 includes the first support 30 that swingably supports the holder 20 has been described. However, the present disclosure is not limited thereto. The movable body 2 may not include the first support 30. That is, the second support 60 may directly support the holder 20.

Furthermore, in the embodiment, the example in which each of the second attraction mechanism 220 and the third attraction mechanism 150 includes the magnet and the magnetic member has been described. However, the present disclosure is not limited thereto. For example, at least one of the second attraction mechanism 220 and the third attraction mechanism 150 may be an elastic member such as a tension spring.

Furthermore, in the above-described embodiment, the example in which the support body 3 supports the movable body 2 in the direction (first direction X) along the direction in which the light L enters the optical element 10 has been described. However, the present disclosure is not limited thereto. For example, the support body 3 may support the movable body 2 in the direction (second direction Y) along the direction in which the light L exits from the optical element 10. Furthermore, the support body 3 may support the movable body 2 in the direction (third direction Z) intersecting the direction in which the light L enters the optical element 10 and the direction in which the light L exits from the optical element 10.

In the embodiment, the example in which the magnetic member 123, the magnetic member 112, and the magnetic member 152 are made of the magnetic material is illustrated. However, the present disclosure is not limited to this. For example, the magnetic member 123, the magnetic member 112, and the magnetic member 152 may be magnets.

In the embodiment, the example in which the holder 20 is supported by the preload unit 40 is illustrated. However, the present disclosure is not limited to this. The holder 20 may be supported by a support mechanism that does not apply the preload to the holder 20. For example, the holder 20 may be supported by a shaft or a support pin.

For example, the present disclosure can be applied to the optical unit.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit comprising:
   a movable body that includes an optical element that reflects light traveling to one side in a first direction to one side in a second direction intersecting the first direction;
   a support body that supports the movable body swingably about a swing axis; and
   a first suction mechanism that generates suction force in the movable body between the movable body and the support body,
   wherein the first suction mechanism includes a first suction magnet and a first suction magnetic member,
   one of the first suction magnet and the first suction magnetic member is disposed in the movable body,
   the other of the first suction magnet and the first suction magnetic member is disposed on the support body,
   the first suction magnet and the first suction magnetic member overlap each other when viewed from a first predetermined direction,
   the first predetermined direction is any one of the first direction, the second direction, and a third direction,
   the third direction is a direction intersecting the first direction and the second direction, and
   a center of the first suction magnet and a center of the first suction magnetic member are separated from each other when viewed from the first predetermined direction.

2. The optical unit according to claim 1, further comprising a second suction mechanism that generates suction force in the movable body between the movable body and the support body,
   wherein the second suction mechanism includes a second suction magnet and a second suction magnetic member,
   one of the second suction magnet and the second suction magnetic member is disposed in the movable body,
   the other of the second suction magnet and the second suction magnetic member is disposed on the support body,
   the center of the other of the first suction magnet and the first suction magnetic member is disposed on one side in a second predetermined direction intersecting the first predetermined direction with respect to the center of one of the first suction magnet and the first suction magnetic member, and
   a center of the other of the second suction magnet and the second suction magnetic member is disposed on the other side in the second predetermined direction with respect to a center of one of the second suction magnet and the second suction magnetic member.

3. The optical unit according to claim 2, wherein
   the movable body includes a holder that holds the optical element and a first support that swingably supports the holder,
   the support body includes a second support that swingably supports the first support,
   one of the first suction magnet and the first suction magnetic member is disposed in the first support,
   the other of the first suction magnet and the first suction magnetic member is disposed in the second support,
   one of the second suction magnet and the second suction magnetic member is disposed in the holder, and
   the other of the second suction magnet and the second suction magnetic member is disposed in the second support.

4. The optical unit according to claim 3, further comprising:
   a first swing mechanism that swings the holder with respect to the first support; and
   a second swing mechanism that swings the first support with respect to the second support,
   wherein the first swing mechanism includes one of the first suction magnet and the second suction magnet, and
   the second swing mechanism includes the other of the first suction magnet and the second suction magnet.

5. The optical unit according to claim 2, further comprising a swing mechanism that swings the movable body with respect to the support body about the swing axis,
   wherein the swing mechanism includes the first suction magnet and a coil facing the first suction magnet,
   the first suction magnetic member is disposed on a side opposite to the movable body with respect to the coil, and a center of the first suction magnetic member is disposed on one side in the second predetermined direction with respect to a center of the coil when viewed from the first predetermined direction.

6. The optical unit according to claim 2, wherein the first suction magnet, the first suction magnetic member, the second suction magnet, and the second suction magnetic member are disposed on an identical plane parallel to the first predetermined direction and the second predetermined direction.

7. The optical unit according to claim 2, further comprising a third suction mechanism that generates suction force along a third predetermined direction intersecting the first predetermined direction and the second predetermined direction in the movable body between the movable body and the support body.

8. The optical unit according to claim 7, wherein the third suction mechanism includes a third suction magnet and a third suction magnetic member.

9. The optical unit according to claim 8, wherein at least one of the first suction magnet, the second suction magnet, and the third suction magnet is shared by at least two suction mechanisms of the first suction mechanism, the second suction mechanism, and the third suction mechanism.

10. The optical unit according to claim 1, wherein the first predetermined direction is the third direction.

11. The optical unit according to claim 1, wherein
the swing axis extends along one of the first direction and the second direction, and
the support body supports the movable body in an axial direction of the swing axis.

\* \* \* \* \*